United States Patent
Yahav et al.

(10) Patent No.: US 10,514,909 B2
(45) Date of Patent: Dec. 24, 2019

(54) SIMILARITY OF BINARIES

(71) Applicant: Technion Research & Development Foundation Limited, Haifa (IL)

(72) Inventors: Eran Yahav, Haifa (IL); Nimrod Sebban Partush, Akko (IL); Moshe Yaniv David, Tel Aviv (IL)

(73) Assignee: Technion Research & Development Foundation Limited, Haifa (IL)

( * ) Notice: Subject to any disclaimer, the term of this patent is extended or adjusted under 35 U.S.C. 154(b) by 0 days.

(21) Appl. No.: 15/939,335

(22) Filed: Mar. 29, 2018

(65) Prior Publication Data

US 2018/0285101 A1 Oct. 4, 2018

Related U.S. Application Data

(60) Provisional application No. 62/478,077, filed on Mar. 29, 2017.

(51) Int. Cl.
*G06F 8/75* (2018.01)
*G06F 8/40* (2018.01)
*G06F 8/53* (2018.01)

(52) U.S. Cl.
CPC ............... *G06F 8/75* (2013.01); *G06F 8/40* (2013.01); *G06F 8/53* (2013.01)

(58) Field of Classification Search
None
See application file for complete search history.

(56) References Cited

U.S. PATENT DOCUMENTS

| | | | | |
|---|---|---|---|---|
| 6,282,698 | B1* | 8/2001 | Baker | G06F 8/75 717/118 |
| 8,381,192 | B1* | 2/2013 | Drewry | G06F 11/3624 712/233 |
| 2009/0172650 | A1* | 7/2009 | Spurlin | G06F 8/53 717/144 |
| 2017/0068816 | A1* | 3/2017 | Cavazos | G06F 21/566 |

OTHER PUBLICATIONS

"Approach for estimating similarity between procedures in differently compiled binaries", Stojanovic et al., Information and Software Technology, Available online Jul. 2, 2014 (Year: 2014).*

* cited by examiner

*Primary Examiner* — Daxin Wu

(57) ABSTRACT

A computer implemented method of estimating a similarity of binary records comprising executable code, comprising converting a first binary record and a second binary record to a first intermediate representation (IR) and a second IR respectively, decomposing each of the first IR and the second IR to a plurality of strands which are partial dependent chains of program instructions, calculating a probability score for each of the plurality of strands of the first IR to have an equivalent counterpart in the second IR by comparing each strand of the first IR to one or more strands of the second IR, adjusting the probability score for each strand according to a significance value calculated for each strand and calculating a similarity score defining a functional similarity between the first IR and the second IR by aggregating the adjusted probability score of the plurality of strands.

20 Claims, 12 Drawing Sheets

```
1   lea    r14d, [r12+13h]
2   mov    r13, rax
3   mov    eax, r12d
4   lea    rcx, [r13+3]
5   shr    eax, 8
6   lea    rsi, [rbx+3]
7   mov    [r13+1], al
8   mov    [r13+2], r12b
9   mov    rdi, rcx
10  call   memcpy
11  mov    ecx, r14d
12  mov    esi, 18h
13  mov    eax, ecx
14  add    eax, esi
15  call   write_bytes
16  test   eax, eax
17  js     short loc_2A38
```

(a) gcc v.4.9 -O3

602B

```
1   mov    r9, 13h
2   mov    r12, rax
3   mov    eax, ebx
4   add    rbp, 3
5   mov    rsi, rbp
6   lea    rdi, [r12+3]
7   mov    [r12+2], bl
8   lea    r13d, [rbx+r9]
9   shr    eax, 8
10  mov    [r12+1], al
11  call   _intel_memcpy
12  add    r9, 5h
13  mov    esi, r9d
14  mov    ecx, r13d
15  mov    eax, ecx
16  add    eax, esi
17  call   write_bytes
18  mov    ebx, eax
19  test   ebx, ebx
20  jl     short loc_342E
```

(b) icc v.15.0.1 -O3 assume $r12_q == rbx_i$

604A

```
1   v1_q = r12_q
2   v2_q = 13h + v1_q
3   v3_q = int_to_ptr(v2_q)
4   r14_q = v3_q
5   v4_q = 18h
6   rsi_q = v4_q
7   v5_q = v4_q + v3_q
8   rax_q = v5_q
```

604B

```
1   v1_i = 13h
2   r9_i = v1_i
3   v2_i = rbx_i
4   v3_i = v2_i + v1_i
5   v4_i = int_to_ptr(v3_i)
6   r13_i = v4_i
7   v5_i = v1_i + 5
8   rsi_i = v5_i
9   v6_i = v5_i + v4_i
10  rax_i = v6_i
``` assert $v1_q == v2_i, v2_q == v3_i, v3_q == v4_i, r14_q == r13_i,$
$v4_q == v5_i, rsi_q == rsi_i, v5_q == v6_i, rax_q == rax_i$

1 ADRP    X0, #to_pack
2 ADD     X0, X0, #to_pack
3 ADD     X1, SP, #0x30
4 MOV     X2, #0
5 BL      packlist_find (a) gcc 4.8 AArch64 -O1

1002B 1 xor   edx, edx
2 mov   rsi, rsp
3 mov   edi, offset to_pack
4 call  packlist_find (b) gcc 4.9 x86_64 -O1

FIG. 10

SIMILARITY OF BINARIES

RELATED APPLICATIONS

This application claims the benefit of priority under 35 USC § 119(e) of U.S. Provisional Patent Application No. 62/478,077 filed on Mar. 29, 2017. The contents of the above applications are all incorporated by reference as if fully set forth herein in their entirety.

FIELD AND BACKGROUND OF THE INVENTION

The present invention, in some embodiments thereof, relates to estimating a similarity of binary records and, more particularly, but not exclusively, to estimating a similarity of binary records according to a semantic match probability between code strands decomposed from each of the compared binary records.

Identifying the origins of executable binary records is a major challenge. This is due to the fact that the source code gets ported, modified, compiled and/or built using various combinations of tool chains, targeting different processor architectures compilers, employing different optimization schemes and/or the like. The challenge is becoming even harder with the binary records being stripped from any debug information to prevent code theft, duplication, reverse engineering and/or the like.

The need for identifying the origins on the other hand is constantly rising. A plurality of applications may require the ability of comparing the binary records in order to identify a common source code origin and/or the like. Such applications may include, for example, deployed software maintenance and/or vulnerability analysis, code theft detection, reverse engineering, security applications for detecting common origins of malicious code agents and/or the like.

SUMMARY OF THE INVENTION

According to a first aspect of the present invention there is provided a computer implemented method of estimating a similarity of binary records comprising executable code, comprising:

Converting a first binary record and a second binary record to a first intermediate representation (IR) and a second IR respectively.

Decomposing each of the first IR and the second IR to a plurality of strands which are partial dependent chains of program instructions.

Calculating a probability score for each of the plurality of strands of the first IR to have an equivalent counterpart in the second IR by comparing the each strand of the first IR to one or more strands of the second IR.

Adjusting the probability score for the each strand according to a significance value calculated for the each strand.

Calculating a similarity score defining a functional similarity between the first IR and the second IR by aggregating the adjusted probability score of the plurality of strands.

Estimating the similarity of the two binary records by decomposing the binary records to the strands after converting (lifting) the extracted assembly code to the IRs may overcome multiple obstacles exhibited by existing methods for similarity estimation, in particular when the build environment of the first binary record differs from that of the second binary record. Moreover, by adjusting the weight for the probability score calculated for each strand according to its significance as detected in plurality of other binary records, the relative contribution of each strand may be emphasized thus achieving a more accurate similarity result. Furthermore, by basing the similarity estimation on the decomposed strands, the estimation may quantify the similarity score rather than just indicate the binary records as similar or not-similar as may be done by the existing methods.

According to a second aspect of the present invention there is provided a system for estimating a similarity of binary records comprising executable code, comprising one or more processors adapted to execute code, the code comprising:

Code instructions to convert a first binary record and a second binary record to a first IR and a second IR respectively.

Code instructions to decompose each of the first IR and the second IR to a plurality of strands which are partial dependent chains of program instructions.

Code instructions to calculate a probability score for each of the plurality of strands of the first IR to have an equivalent counterpart in the second IR by comparing the each strand of the first IR to one or more strands of the second IR.

Code instructions to adjust the probability score for the each strand according to a significance value calculated for the each strand.

Code instructions to calculate a similarity score defining a functional similarity between the first IR and the second IR by aggregating the adjusted probability score of the plurality of strands.

In a further implementation form of the fifth and/or sixth aspects, the first binary record and/or the second binary record are stripped binaries comprising no debugging information. The stripped binary records may include no debugging information thus making it difficult to trace the source code from which the binary record(s) originates, identify the build environment and/or the like. Converting the binary records to their respective IRs, decomposing to the strands and estimating the similarity of the two binary records by comparing at strand level may not require prior information on the origins of the binary records.

In a further implementation form of the fifth and/or sixth aspects, the first binary record and the second binary record are each generated from a source code for different processor architectures. Converting the binary records to their respective IRs may result in architecture independent (agnostic) IRs thus enabling comparison of binary records targeting different processor architectures.

In a further implementation form of the fifth and/or sixth aspects, the first binary record and the second binary record are each generated from a source code using a different tool chain. Converting the binary records to their respective IRs may result in tool chain independent (agnostic) IRs thus enabling comparison of binary records built, compiled, linked and/or the like using different tool chains and/or different versions of the tool chains.

In a further implementation form of the fifth and/or sixth aspects, the first binary record and the second binary record are each generated using different optimization schemes. Converting the binary records to their respective IRs may bring the IRs in general and the strands in particular to their most basic representation thus overcoming different optimization levels that may have been applied during the build of the binary records.

In a further implementation form of the fifth and/or sixth aspects, the first binary record and the second binary record are each generated from a different version of a source code. Converting the binary records to their respective IRs may bring the IRs in general and the strands in particular to their most basic representation thus overcoming variations in the origin source code, i.e. different source code versions. Moreover, by comparing the binary records at strand level, similar strands may be identified as similar while modified strands may also be identified thus allowing quantifying the similarity score for the two binary records.

In a further implementation form of the fifth and/or sixth aspects, the first IR and the second IR are processor architecture independent, the first IR and the second IR are members of a group consisting of: a Low Level Virtual Machine IR (LLVM-IR), an Intermediate Verification Language IR (IVL-IR), a Mcsema IR (Mcsema-IR), a Valgrind's RISC-like Intermediate Language IR (VEX-IR) and a Binary Analysis Platform IR (BAP-IR). Supporting the plurality of IRs may allow flexibility in the similarity estimation implementation. In addition, the similarity estimation may use different IR formats or frameworks in different comparison scenarios according to the advantages that may be presented by each of the IR formats and/or frameworks.

In a further implementation form of the fifth and/or sixth aspects, the comparing comprising syntactically analyzing each of the plurality of strands of the first IR and the second IR after canonicalizing the each strand by optimizing the each strand out of context using a virtual machine language optimizer and comparing a syntactic equivalence of the each strand of the first IR to the one or more strands of the second IR. The syntactic analysis and comparison of the strands may allow for a simple, efficient and/or straight forward comparison as the comparison is based on syntactic comparison of the elements of the strands. To allow for the syntactic comparison, the strands are first optimized out of context in order to bring them to a canonicalized representation which may be a singular, standard and/or common presentation.

In an optional implementation form of the fifth and/or sixth aspects, one or more of the strands are normalized after canonicalization by renaming symbols detected in the each strand in a sequential order to remove name spaces inherited from a context of a respective one of the first IR and second IR. Normalizing the canonicalized strands may further bring the strands to their most basic singular and standard representation by removing namespace left over from the assembly code extracted from the binary record.

In a further implementation form of the fifth and/or sixth aspects, the comparing comprising semantically analyzing each of the plurality of strands of the first IR and the second IR and comparing a semantically equivalence of the each strand of the first IR to the one or more strands of the second IR. The semantic analysis and comparison of the strands may allow estimating the behavioral similarity of the strands.

In a further implementation form of the fifth and/or sixth aspects, the semantic analysis comprises creating a joint execution flow containing the each strand of the first IR to the one or more strands of the second IR, applying one or more equality assumptions over one or more inputs to the joint execution flow and comparing one or more assertions applied to one or more variables of the joint execution flow, the one or more variables is a member of a group consisting of: a temporary variable and an output variable. By assuming values for the input(s) to the strands and asserting values for the variables of the strands, the behavioral functionality of each strand may be assessed and the similarity of the two strands and be estimated and quantified.

In an optional implementation form of the fifth and/or sixth aspects, the semantically equivalence comparison is conducted in case the strand of the first IR exceeds a size threshold compared to the one or more strands of the second IR. This is to avoid comparing strands that are very different in size and may therefore present little similarity with each other. This may significantly reduce the comparison cycles and hence reduce the computation load, computation time and/or the like sine irrelevant comparison may be avoided. Moreover, strands that are deemed too small and may thus lack uniqueness and therefore present insignificant contribution may be discarded from the comparison analysis and to further reduce the computation load, computation time and/or the like.

In an optional implementation form of the fifth and/or sixth aspects, the semantically equivalence comparison is done in one or more batches comprising a plurality of comparison queries of each strand of the first IR to a plurality of strands of the second IR. This may allow expediting the semantic analysis by querying a plurality of similarity queries simultaneously thus expediting the similarity estimation process.

In a further implementation form of the fifth and/or sixth aspects, the significance value of the each strand is estimated by statistically analyzing a plurality of strands extracted from a plurality of binary records to detect a uniqueness of each strand. Assigning the significance value to each strand according to its significance as detected by statistically analyzing a plurality of binary records (pool) may significantly increase the accuracy of the significance value thus representing the real relative contribution of each strand to the overall similarity score.

In an optional implementation form of the fifth and/or sixth aspects, the statistical analysis is conducted over a randomly selected subset of the plurality of binary records. Reducing and limiting the number of binary records that are statistically analyzed may reduce one or more computation resources, for example, computation power, computation time, storage resource(s) and/or the like for computing the significance value for each strand. It is demonstrated that limiting the selected binary records participating in the statistical analysis to a relatively small but sufficiently large number may have insignificant and/or no impact on the accuracy of the significance value.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 is a capture of exemplary assembly code snippets and their respective Low Level Machine Language Intermediate Representation (LLVM-IR), according to some embodiments of the present invention;

FIG. 6 is a capture of exemplary assembly code snippets and their respective Intermediate Virtual Language (IVL) intermediate representations, according to some embodiments of the present invention;

FIG. 8 is a heat-map graph presenting results of an All-vs-All experiment for evaluating performance of similarity by decomposition evaluation based on semantic comparison, according to some embodiments of the present invention;

FIG. 10 is a capture of exemplary assembly code snippets of a common source code compiled to target Intel and ARM processor architectures;

DESCRIPTION OF SPECIFIC EMBODIMENTS OF THE INVENTION

Figure 1:
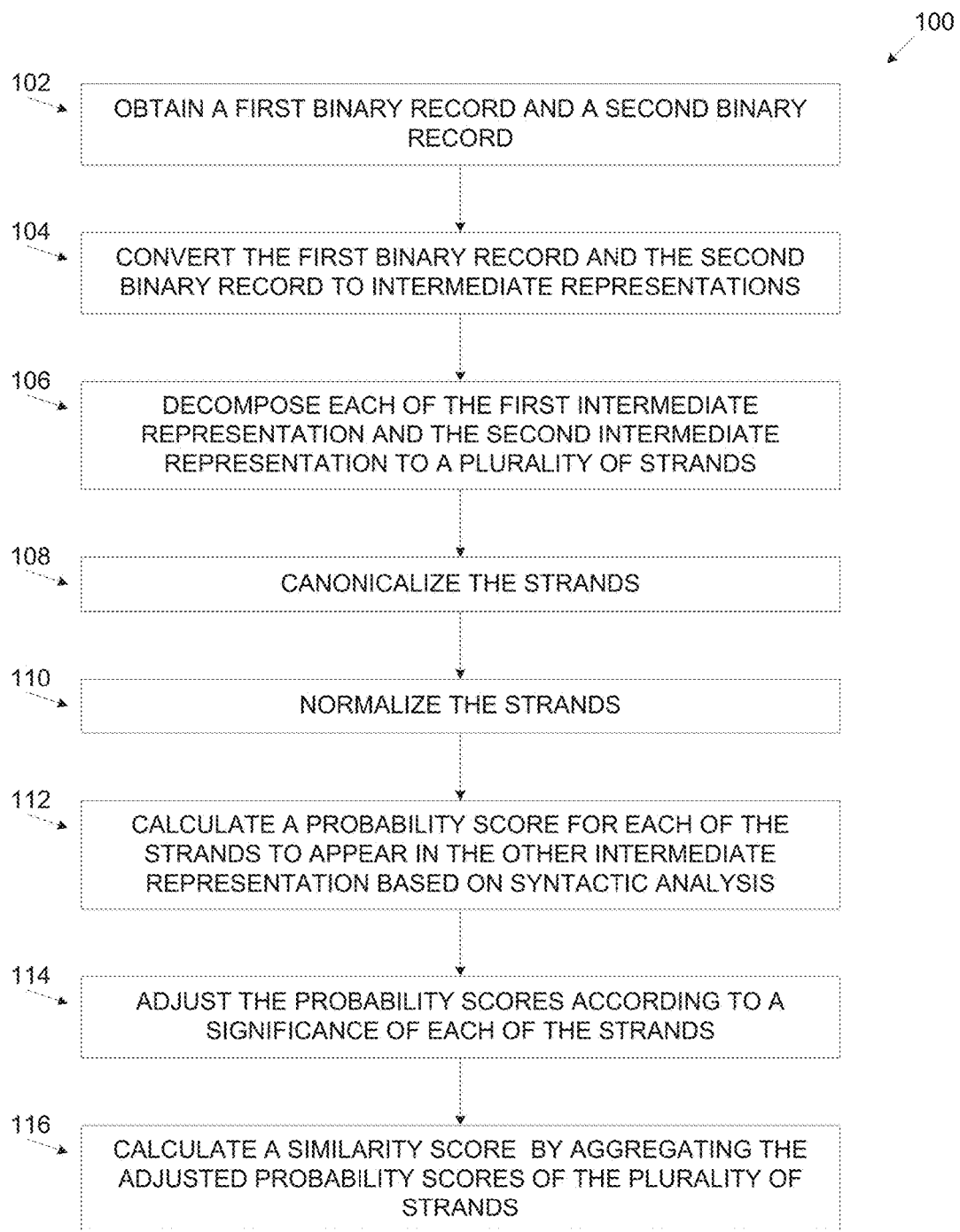
FIG. 1 is a flowchart of an exemplary process of estimating a similarity of binary records based on a syntactic analysis, according to some embodiments of the present invention.

The present invention, in some embodiments thereof, relates to estimating a similarity of binary records and, more particularly, but not exclusively, to estimating a similarity of binary records according to a semantic match probability between code strands decomposed from each of the compared binary records.

According to some embodiments of the present invention, there are provided methods, systems and computer program products for estimating a similarity of two binary records (first and second binary records), for example, a file, an image and/or the like each comprising executable code in order to determine whether the binary records originate at least partially from a common source code. The two binary records may be generated, compiled and/or built for different processor architectures, using different build tool chains, originate from different versions of the common source code and/or the like. Optionally, one or more of the binary records is a stripped binary comprising no debugging information and/or symbols.

Assembly code is first extracted from the compared binary records and converted to an intermediate representation (IR) which may be (processor) architecture independent (agnostic) using one or more tools as known in the art, for example, IVL, LLVM-IR and/or the like. Each of the generated IRs may comprise one or more a procedure, a routine and/or the like which may be each split to one or more basic blocks. Each of the IRs, procedures, routines and/or basic blocks is further decomposed to a plurality of strands where each strand comprises a chain (set) of program instructions (i.e. a trace) for processing a certain variable and each of the strands may be partially dependent on one or more other strands. The strands may be canonicalized and normalized to standardize the strands representation through commonly known, uniform representations.

A probability score for each of the strands is then calculated for each of the strands of the first binary record to appear in the second binary record. The probability score may be calculated by comparing each strand of the IR generated for the first binary record (query strand) to one or more strands of the IR generated for the second binary record (target strand). The same evaluation may be repeated in the other direction as well, i.e. of a strand of the second IR to be present in the first IR. The computation of the probability score may be based on a syntactic (syntax) analysis and/or a semantic (behavioral) analysis of the strands. The syntactic analysis is done after the strands are canonicalized and normalized strands to transform each of the strands to a standard common and uniform representation that may be compared to each other. The semantic analysis may be done by simulating the behavioral execution flow of the strands according to assumptions and assertions made with respect to the inputs, variables and/or outputs of the compared strands.

Optionally, for the semantic analysis, one or more size thresholds may be set to allow comparison of strands of the same magnitude, for example, a number of inputs threshold, a number of variables threshold and/or the like. Furthermore, strands that have a size that does not exceed the size threshold may be discarded from the semantic analysis as they may typically provide a little and practically negligible contribution to identifying similarity between the compared IRs.

The probability score calculated for each of the strands may be adjusted according to a significance value assigned to the strand in the binary record such that unique strands may be adjusted to have a larger contribution to the overall similarity of the IRs while trivial and/or common strands that may randomly match strands in the other binary record may be adjusted to have a smaller contribution to the overall similarity. The significance values may be estimated based on a statistical analysis of a plurality of binary records, specifically a large code base to identify the significance, for example, uniqueness (a rate of appearance) of each of the strands in a code base comprising a plurality of binary files. Unique strands may typically originate from the source code and may therefore enclose significant semantics, for example, a characteristic, a feature and/or a functionality of the source code used to build the binary records or a part thereof. This may be in contrast to common or trivial strands shared (evident in) by a plurality of binary records and may therefore be less indicative of the similarity between the two specific binary records.

The overall similarity between the IR of the two binary records may be computed by aggregating the adjusted probability scores of all strands of each of the IRs.

The similarity by decomposition estimation between the binary records, in particular stripped binary records based on evaluating their strands similarity may present significant advantages compared to existing methods for matching binary records. The similarity by decomposition may be applied to a plurality of applications, for example, tracing origins of deployed software for maintenance purposes and/or vulnerability isolation, detection of code piracy where code is copied illegally from other code products, reverse engineering, security applications for detecting code patterns shared between malicious code agents and/or the like. Most of the exiting methods for comparing binary records rely on syntactic comparison. However these methods typically fail to compare the source code when generated by different tool chains, targeting different processor architectures (different instruction sets), using different optimization schemes and/or the like. The existing methods may further fail to produce accurate results when comparing binary records generated from different versions of the same source code. The similarity by decomposition on the other hand may overcome such obstacles. Converting (lifting) the assembly code extracted from the binary files to the IRs may reduce and/or eliminate all together dependency on the environment in which the binary records are build, compiled and/or built, for example, the target processor architecture, the tool chain used, the optimization level and/or the like.

Breaking the IRs generated for the binary records to basic blocks and further breaking the basic blocks to strands which are the smallest comparable code units may allow for an accurate comparison which may provide a quantitative measure for the similarity rather than a binary yes/no measure as may be done by the existing methods. Basing the comparison on strands equivalence may further overcome comparison difficulties resulting from changes made to the source code from which the compared binary records are built. For example, in case the two binary records are generated from one or more source code segments which are revised, patched and/or the like between the build times of the two binary records, breaking the code to the strands may allow quantifying the similarity between the binary records while they do not fully match each other. Furthermore, the stripped binary records may include no debugging information to support the comparison. However by simulating the behavioral characteristics of the extracted code at the strands level the equivalence of the strands may be estimated according to their inputs, outputs and/or variables without having the actual behavioral information.

Moreover, by adjusting the probability score of each strand according to its significance based on the statistical analysis the relative contribution of each strand to the overall similarity may be increased and/or reduced according to its significance. This may allow the higher significance strands to have a significantly higher impact on the overall similarity of the binary records compared to common and/or trivial strands which have a lesser impact on the overall similarity. This is of major importance to the accuracy of the similarity estimation as the unique strands may typically originate from the source code while the common and/or trivial strands that may typically be artifacts introduced by the tool chain(s) used to generate the binary records. This may further reduce the dependency on the tool chains such that binary files generated for different processor architectures, different tool chains and/or the like may be compared with a significantly high accuracy level. In addition by reducing and/or eliminating the dependency of the comparison on the binary records build environment, the rate of false positive events may be significantly reduced compared to the existing methods. This is since many of the false positive events produced by the exiting methods may result from the fact that a high emphasize may be put to code segments which are in fact introduced by the tool chain and/or build environment and do not actually carry a semantic value of the source code.

Furthermore, by estimating the similarity according to the similarity of the decomposed strands, one or more optimization techniques may be applied according to the characteristics of the strands such that strands having substantially similar characteristics, for example, a size, a number of variables and/or the like are compared. Comparison of strands which are significantly different from each other may thus be discarded. This may significantly reduce required computing resource, for example, computing power, time and/or the like.

In addition, the similarity by decomposition may be highly scalable as a plurality of comparison operations of the decomposed strands may be done simultaneously in parallel.

Also, when applying the syntactic analysis, by standardizing (canonicalizing and normalizing) the strands to a uniform representation, the comparison process may be simple and straight forward thus significantly reducing the computation resources.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

According to some embodiments of the present invention estimating the similarity of binary records and/or parts thereof may be done by applying either a syntactic analysis and/or a semantic analysis to identify the functional similarity of the binary records and/or part thereof. The processes for evaluating the similarity based on the syntactic analysis and the semantic analysis may share some common steps while other steps may be unique and/or adjusted for one of the processes or the other.

The similarity estimation based on syntactic analysis for estimating the similarity by comparing syntactic representations of the binary records is first described.

Referring now to the drawings, FIG. 1 illustrates a flowchart of an exemplary process of estimating a similarity of binary records based on a syntactic analysis, according to some embodiments of the present invention. An exemplary process 100 may be executed to estimate a similarity level of two binary records, for example, a file, an image and/or the like each comprising executable code in order to determine whether the binary records originate at least partially from a common source code. The two binary records may be generated, compiled and/or built for different processor architectures, using different build tool chains, originate from different versions of the common source code and/or the like. Optionally, one or more of the binary records is a stripped binary comprising no debugging information and/or symbols.

The process 100 starts with converting each of the binary records to an intermediate representation (IR) which may be (processor) architecture independent (agnostic) using one or more tools as known in the art, for example, IVL, LLVM-IR and/or the like. Each of the generated IRs may comprise one or more a procedure, a routine and/or the like which may be each split to one or more basic blocks. Each of the IRs, procedures, routines and/or basic blocks may be decomposed to a plurality of strands where each strand comprises a chain (set) of program instructions for processing a certain variable and each of the strands may be partially dependent on one or more other strands. The strands may be canonicalized and normalized to standardize the strands representation through commonly known, uniform representations.

In general, evaluating the similarity of two binary records may be presented as follows. Given a query procedure q of a first binary record, for example the binary record 220A and a large collection T of (target) procedures of a second binary record, for example the binary record 220B, in binary form, the goal of the process 100 is to quantitatively define the similarity of each procedure t∈T to the query q.

The process 100 continues with calculating a probability score for each of the strands. The probability score represents the probability of a respective strand of one IR, for example, the IR generated from the first binary record to appear (evident) in the other IR, i.e. the IR generated from the first binary record. The same evaluation may be repeated in the other direction as well, i.e. of a strand of the second IR to be present in the first IR. The probability is estimated by checking for syntactic (syntax) similarity of each of the canonicalized and normalized strands of the first IR to one or more strands of the second IR. The probability score calculated for each of the strands may be adjusted according to a significance value assigned to the strand in the binary record such that unique strands may be adjusted to have a larger contribution to the overall similarity of the IRs while trivial and/or common strands that may randomly match strands in the other binary record may be adjusted to have a smaller contribution to the overall similarity. The significance values may be estimated based on a statistical analysis of a plurality of binary records, specifically a large code base to identify the significance, for example, uniqueness (a rate of appearance) of each of the strands in a plurality of binary files. It is assumed that unique strands are likely to indicate a significant semantics, for example, a characteristic, a feature and/or a functionality of the binary record or a part thereof. This is in contrast to common or trivial strands shared (evident in) by a plurality of binary records and may therefore be less indicative of the similarity between the two specific binary records.

Calculating the overall similarity between the IR of the two binary records may be done by aggregating the adjusted probability scores of all strands of each of the IRs.

Figure 2:
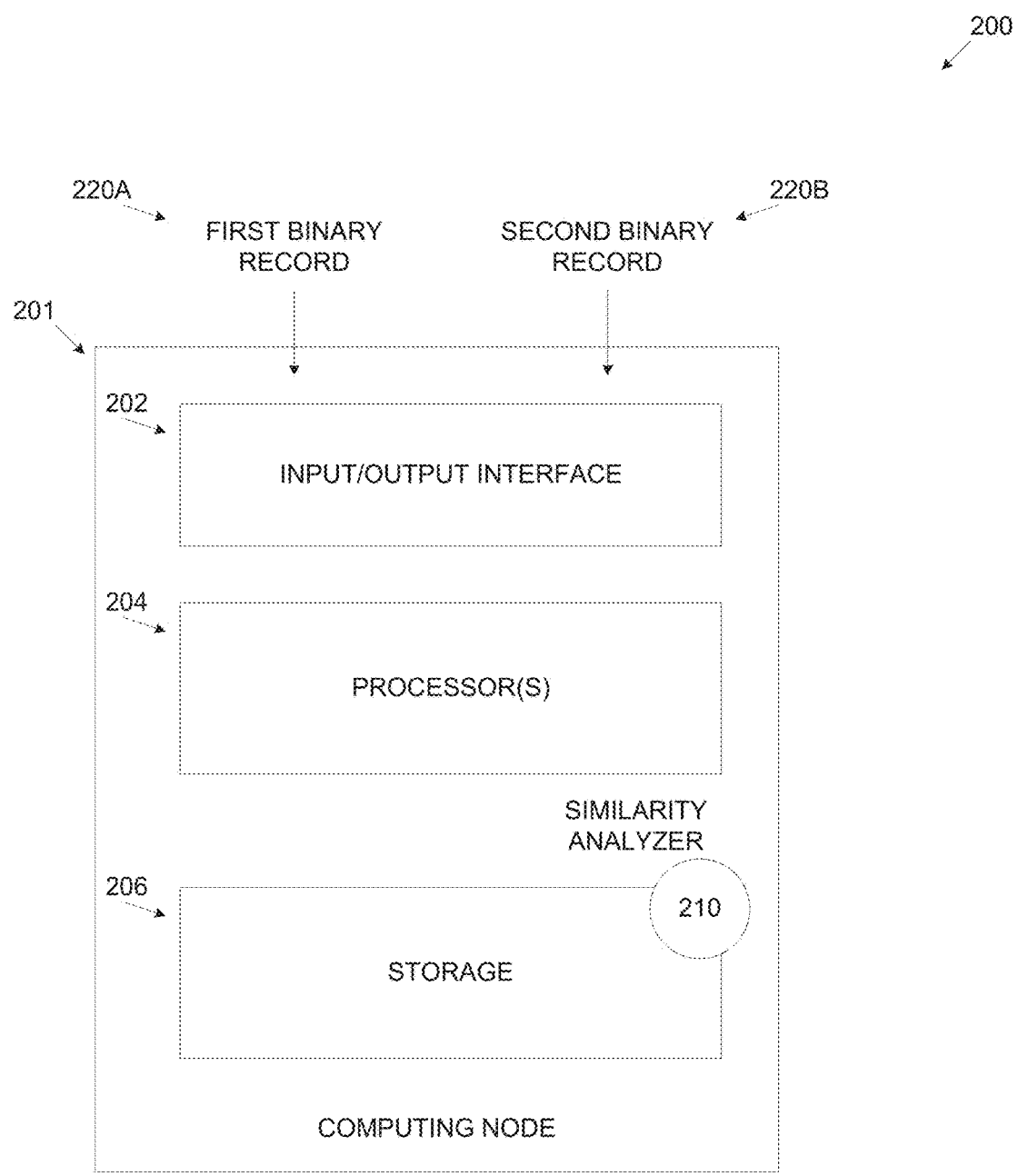
FIG. 2 is a schematic illustration of an exemplary system for estimating a similarity of binary records, according to some embodiments of the present invention.
Figure 4:
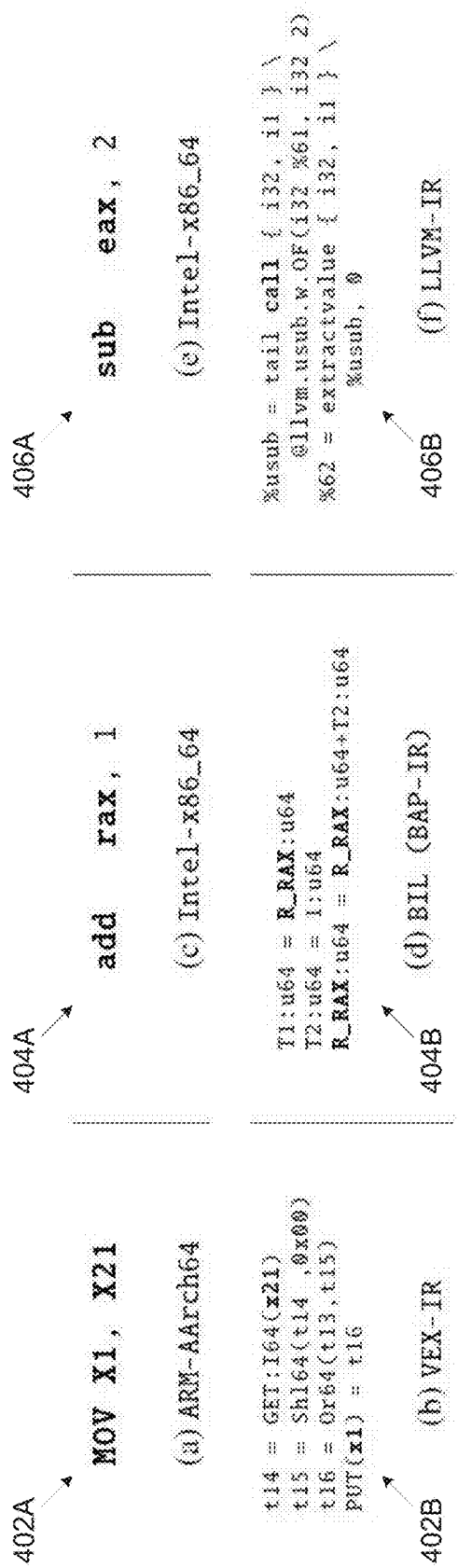
FIG. 4, which is a capture of exemplary assembly code snippets and their intermediate presentation (IR)

Reference is also made to FIG. 2, which is a schematic illustration of an exemplary system for estimating a similarity of binary records, according to some embodiments of the present invention. An exemplary system 200 for estimating similarity of binary by applying a process such as the process 100 comprises a computing node 201 for example, a computer, a server, a cluster of computing nodes and/or any computing device. The computing node 201 may include an input/output (I/O) interface 202, a processor(s) 204 and a storage 206.

The I/O interface 202 may provide one or more interconnect interfaces, for example, a network interface, a local interface and/or the like. The network interface may support one or more wired and/or wireless network interfaces for connecting to one or more networks, for example, a Local Area Network (LAN), a wide Area Network (WAN), a Wireless LAN (WLAN) (e.g. Wi-Fi), a cellular network and/or the like. The local interface may include one or more interfaces, for example, a Universal Serial Bus (USB) interface, a memory management controller (MMC) interface, a serial interface and/or the like for connecting to one or more peripheral devices, for example a storage device and/or the like.

The processor(s) 204, homogenous or heterogeneous, may be arranged for parallel processing, as clusters and/or as one or more multi core processor(s).

The storage 206 may include one or more computer readable medium devices, either persistent storage and/or volatile memory for one or more purposes, for example, storing program code, storing data, storing intermediate computation products and/or the like. The persistent storage may include one or more persistent memory devices, for example, a Flash array, a Solid State Disk (SSD) and/or the like for storing program code. The volatile memory may include one or more volatile memory devices, for example, a Random Access Memory (RAM) device.

The processor(s) 204 may execute one or more one or more software modules, for example, a process, an application, an agent, a utility, a script, a plug-in and/or the like. Wherein a software module may comprises a plurality of program instructions stored in a non-transitory medium such as the program store 206 and executed by a processor such as the processor(s) 204. The processor(s) 204 may execute, for example, a similarity analyzer 210 for estimating a similarity between the binary records. Optionally, the similarity analyzer 210 may be utilized as one or more remote services, for example, a remote server service, a cloud service, Software as a Service (SaaS), a Platform as a Service (PaaS) and/or the like.

As shown at 102, the process 100 starts with the similarity analyzer 210 obtaining two binary records, for example, a file, an image and/or the like. One or more of the binary records may be stripped binaries comprising no debugging information. Since the similarity is estimated between two binary records, the two compared binary records may be designated a first binary record 220A and a second binary record 220B. The similarity analyzer 210 may obtain the first binary record 220A and/or second binary record 220B from the storage 206 and/or from one or more external resources accessible through the I/O interface 202. For example, the similarity analyzer 210 may retrieve the binary records 220A and/or 220B from one or more remote resources available through the network interface(s) of the I/O interface 202. In another example, the similarity analyzer 210 may retrieve the binary records 220A and/or 220B from one or more peripheral devices, for example, a USB memory card accessible through the local interface(s) of the I/O interface 202.

As shown at 104, the similarity analyzer 210 converts the binary records 220A and 220B to a respective IRs which are platform (processor architecture) agnostic meaning the IRs are independent of the processor architecture for which the binary records 220A and/or 220B are generated, compiled and/or built. The conversion of the binary files 220A and 220B to their respective IRs may be done in two stages.

First the similarity analyzer 210 may use one or more binary to assembly conversion methods, techniques and/or tools as known in the art to extract assembly code from the binary records 220A and 220B and create corresponding assembly code segments. The conversion is naturally done according to the build environment, for example, the processor architecture, the tool chain and/or the like in which each of the binary records 220A and 220B are originally generated, compiled and/or built.

After extracting the assembly code from the binary records 220A and 220B, the similarity analyzer 210 converts (lifts) the extracted assembly code segments to IRs, for example, IVLs, LLVM-IRs and/or the like. The generated IRs may be architecture-agnostic, in particular independent of the processor architecture which the binary records 220A and 220B originally targeted. This may allow the similarity analyzer 210 to identify the semantic expressions of the assembly code while avoiding the specific implementation of each of the assembly segment which may depend on a plurality of parameters of the build environment in which each of the binary records 220A and 220B is generated, compiled and/or built. The build environment parameters may include, for example, target processor architecture, a tool chain, a tool chain version, arbitrary register use by the tool chain, an optimization level, an instruction selection and/or the like.

Typically, when applying the syntactic analysis, the similarity analyzer 210 may use one or more tools as known in the art to create LLVM-IRs for the binary records 220A and 220B. LLVM-IRs may result is architecture-agnostic IRs. Additionally, the LLVM-IR format and accompanying tool-suite are well documented, well maintained and have a plethora of tools for creation, translation and manipulation. Optionally, the similarity analyzer 210 may apply one or more translators to convert the IRs of one or more of the binary records 220A and/or 220B from one or more IR formats to the LLVM-IR. For example, the similarity analyzer 210 may use the translator(s) to convert IRs created using one or more frameworks, for example, Mcsema IR, Valgrind's RISC-like Intermediate Language IR (VEX-IR), Binary Analysis Platform (Framework) (BAP) and/or the like to the LLVM-IR. This may allow translating binary records built for processor architecture which are not supported by the LLVM-IR conversion tools but may be supported by the VEX-IR conversion tools. It should be stated that above frameworks may not attempt to perform a de-compilation of the binary code, but rather represent the binary instructions' semantics. This may be done by representing the machine state using variables, and translating the machine instructions to operations on these variables, according to the machine specification. This conversion is accomplished by translating each assembly instruction in the binary record into the IR, which explicitly specifies how the instruction affects the machine's memory and registers, including flags.

Figure 3:
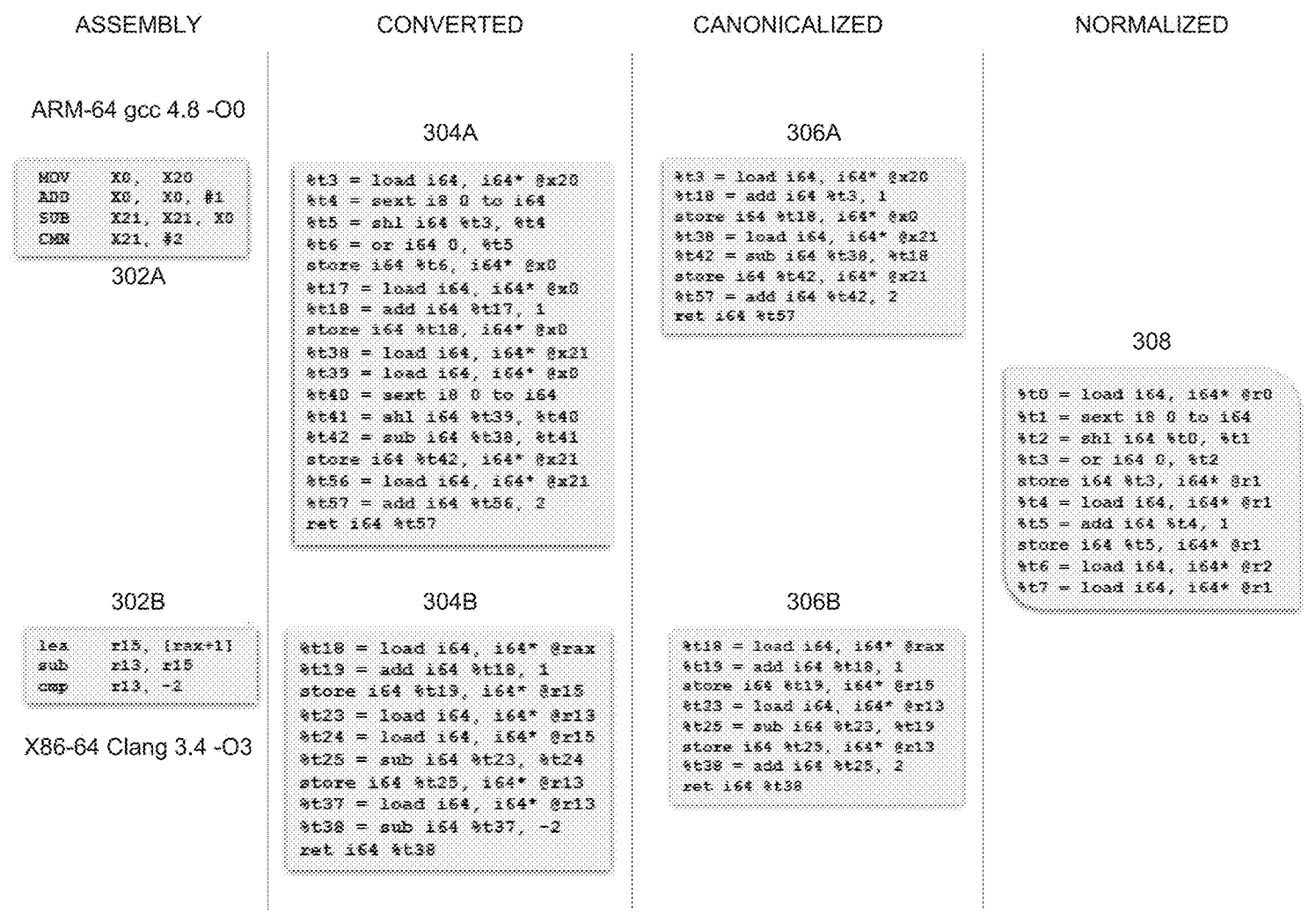

Reference is now made to FIG. 3, which is a capture of exemplary assembly code snippets and their respective Low Level Machine Language Intermediate Representation (LLVM-IR), according to some embodiments of the present invention. Exemplary captures 302A and 302B are snippets of assembly code segments of a generated for a similar source code taken from a version of the OpenSSL code package. The capture 302A presents the assembly code segment generated using the gcc version 4.8 targeting the AArch64 (64-bit ARM) architecture choosing the –O0 optimization level. The capture 302B presents the assembly code segment generated using the icc version 15.0.3 targeting the x86_64 Intel architecture choosing the –O3 optimization level. As evident while the two assembly code segments presented in the captures 302A and 302B for a certain computation procedure are derived from the same (high level) source code, the assembly code segments may be different due to one or more build factors, for example:

Different tool chain. Each of the code segments presented in the captures 302A and 302B is built using a different tool chain targeting different processor architectures. This may inherently lead to differences in the generated assembly code.

Arbitrary register use. The inputs for the computation are stored in three different sets of registers X0, X20 and X21 in the capture 302A and rax, r15 and r13 in the capture 302B. The register selection process of the compiler is driven by various heuristics and intricate code pass specifics, which results in a fairly arbitrary selection of registers. Under certain scenarios, even well-known conventions like using rbp for the stack frame head, are not adhered by the compiler.

Cross optimization variance. Syntactic differences between the assembly code segments presented in 302A and 302B may result from different optimization settings. For example, the assembly code segment of 302A is optimized with –O0 settings for the gcc and contains a move and an addition operation which could have been easily been united to one instruction, for example, ADD X1, X20, #1. On the other hand the icc generated code presented in the capture 302B demonstrates the use of the lea instruction to perform a binary arithmetic operation and putting the result in a third register without causing other side effects since the Intel instruction set architecture (ISA) does not support three-address-code instructions as the ARM architecture does.

Different instruction selection: The snippets of 302A and 302B check whether the input values are equal using different instructions—the cmn instruction in in the capture 302A and cmp instruction in the capture 302B. The instruction cmn has similar semantics to the better known cmp instruction, yet the former uses addition instead of subtraction to check for equality. This change causes the comparison to be performed against the constant 2 instead of –2.

These variations, found in the short simple computation presented in the snippets of 302A and 302B demonstrate the challenge in establishing similarity in binary code records such as, for example, the binary records 220A and 220B. Additional variations may be introduced by application of different optimization levels, using different compilers, or targeting different machine architecture and/or the like. In addition, the variations may also result from the binary records 220A and 220B are generated from different versions of the source code, where some modifications may be introduced between the different source code versions.

Therefore converting the assembly segments originating from the binary records 220A and 220B to their respective LLVM-IRs may allow overcoming at least some of the variations between the assembly segments extracted from the binary records 220A and 220B. Exemplary captures 304A and 304B present the same assembly code of the captures 302A and 302B respectively after converted to the LLVM-IRs.

Reference is made once again to FIG. 1.

As shown at 106, the similarity analyzer 210 may split each of the procedures, routines and/or the like of each of the IRs to one or more basic blocks and may further decompose each of the basic blocks to a plurality of strands which are the basic units used for the similarity analysis. Each of the strands decomposed from the IRs, procedures, routines and/or basic blocks comprises a chain (set) of program instructions (i.e. a trace) for processing a certain variable of the basic block and each of the strands may be partially dependent on one or more other strands of the basic block (backward slice from the variable).

The similarity analyzer 210 may apply a standard control flow graph (CFG) representation for the basic blocks and decompose the basic blocks using one or more slicing methods as known in the art. The similarity analyzer 210 may slice each basic block until all variables are covered. Since the similarity analyzer 210 may handle each basic block separately, the inputs for each of the basic blocks may be variables (registers and memory locations) used before they are defined in the current basic block. The captures 304A and 304B present exemplary strands extracted from respective basic block. Decomposing the IRs basic blocks to the plurality of strands is a practical compromise over enumerating all paths in the Program Dependency Graphs (PDG). The similarity analyzer 210 may obtain the obtained by decomposing the PDG at basic block boundaries. This means that strands only contain data dependencies, as control dependencies exist only over basic block boundaries, while severed data dependencies (e.g., values created outside the basic block) are marked as such and used in the comparison process as described in Algorithm 1 below. This approach may improve performance of the similarity analysis for most scenarios compared to existing methods, in particular when the basic block is large and may be sliced to multiple sufficiently distinct strands.

```
Algorithm 1:

Input: b - an array of instructions for a basic block
Output: strands - b's strands along with their inputs
1  unusedInsts ← {1, 2, ..., |b|}; strands ← [ ]
2  while unusedInsts ≠ 0 do
3     maxUsed ← max(unusedInsts) ;
4     unusedInsts \= maxUsed;
5     newStrand ← [b[maxUsed]];
6     varsRefed ← Ref(b[maxUsed]);
7     varsDefed ← Def(b[maxUsed]);
8     for i ← (maxUsed − 1) ... 0 do
9        nedeed ← Def(b[i]) ∩ varsRefed;
10       if nedeed ≠ 0 then
11          newStrand += b[i];
12          varsRefed ∪= Ref(b[i]);
13          varsDefed ∪= needed;
14          unusedInsts\= i;
15    inputs ← varsRefed \ varsDefed;
16    strands += (newstrand, inputs);
```

The similarity analyzer 210 executing the Algorithm 1 may use standard machinery as known in the art to extract the strands from each basic block. The similarity analyzer 210 may use the standard notions of Def and Ref for the sets of variables defined and referenced (respectively) in a given instruction in the basic block. The algorithm 1 starts with putting all instructions in an unused instructions list unusedInsts, and ends only when this list is empty, i.e., when every instruction in the basic block is marked as having been used in at least one extracted strand. The creation of a new strand begins by taking the last non-used instruction, as well as initializing the list of variables referenced in the strand—varsRefed, and the list of variables defined in the strand—varsDefed. Next, all of the previous instructions in the basic block are iterated backwards (for loop), adding any instruction that defines a variable referenced in the strand so far, i.e. is in the varsRefed and updating varsRefed and varsDefed with every added instruction. When the for loop is finished the new strand is complete, as every instruction needed to calculate all of the variables defined inside the basic block is present. This does not include the inputs, which are any variables used in the calculation and not defined in the basic block. It should be noted that the backward iteration is crucial for minimizing the number of strands. This algorithm repeats this (while loop) until all instructions in the basic block are included in one of the created strands.

As shown at 108, the similarity analyzer 210 transforms the decomposed strands to a canonicalized representation which may be a common and/or standard implementation convention employing, for example, a standard instruction set, standard syntax and/or the like. This allow representing the extracted strands in a standard common and consistent manner independently of the build environment parameters used for generating, compiling and/or building the binary records 220A and/or 220B.

The variations between assembly code segments generated from a common source code may be demonstrated through the captures 304A and 304B. Examining the exemplary snippets presented in the captures 304A and 304B may expose the challenges introduced by the conversion of the assembly code segments to the LLVM-IR representations. In particular the challenges involved with identifying similarity between strands originating from different binary records, for example, the binary records 220A and 220B. As shown at 304A a very complex set of instructions is produced (in 304A) to express the register move operation (MOV X0, X20 in 302A) which includes an or operation and a shift operation. In addition, as shown in both exemplary snippets presented in 304A and 304B redundant load operations are performed, loading t39 (in 304A) and t24 in (304B) instead of using t17 and t19 respectively. Also as evident from the captures 302A, 302B, 304A and 304B, the modeling of the CMN operation (302A) uses an add instruction (304A), while the CMP (302B) is modeled using sub in 304B.

The variations in the assembly code segments may be further demonstrated through additional exemplary assembly code snippets.

Figure 5:
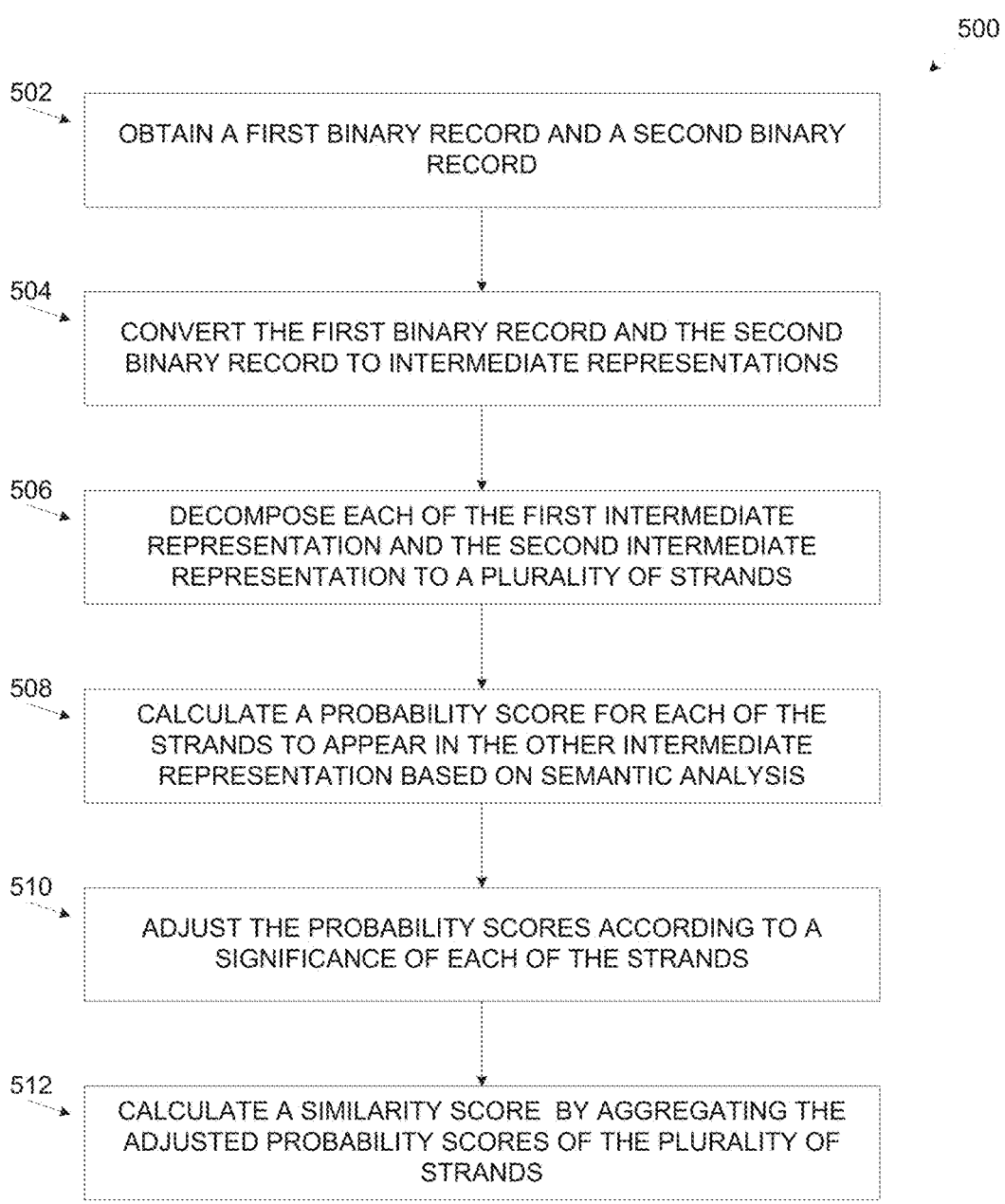
FIG. 5 is a flowchart of an exemplary process of estimating a similarity of binary records based on a semantic analysis, according to some embodiments of the present invention.

Reference is now made to FIG. 5, which is a capture of exemplary assembly code snippets and their intermediate presentation (IR). Captures 402A, 404B and 406C present three simple examples demonstrating the effects of the variations in the respective LLVM-IRs 402B, 404B and 406B. The capture 402A presents a simple MOV (move) instruction in 64-bit ARM assembly, and the capture 402B shows the VEX-IR code generated for the MOV instruction. As evident from the captures 402A and 402B, the fairly trivial instruction MOV is modeled using several relatively complex arithmetic operations and three possibly redundant temporary values (t14, t15 and t16). The capture 404A presents a simple add instruction in 64-bit x86 assembly, and the capture 404B presents the BIL (BAP-IR) code created for the add instruction. This conversion may not take advantage of the fact that one of the arguments is a constant, and creates a redundant temporary value (T2) for the constant argument. This temporary value is then used in subsequent addition operation, even though the BIL allows for an addition between a temporary and a constant. The capture 406A displays a 32-bit subtraction instruction in 64-bit x86 assembly, and the capture 406B shows the LLVM-IR code created by Mcsema. The created IR may model a more complex computation, for example, an unsigned subtraction with overflow, which returns a struct containing the subtraction's result and the overflow indication. This if condition may be performed even though the next assembly commands do not check the overflow flag, and accordingly the LLVM-IR may not extract the second part of this struct. For some use cases, the variance and redundancy of the produced IR are immaterial. However in the context of program similarity, these variations may prevent accurate comparison and combined with other challenges of finding similarity between different architectures and optimization levels, theses variations may become disastrous.

Reference is made once again to FIG. 1.

Therefore, in order to overcome the syntactic variations that may be present in the extracted strands, the similarity analyzer 210 may process the decomposed strands to represent each strand through the canonicalized and optionally normalized representation. Thus, through the canonicalization process, the similarity analyzer 210 may transform semantically equivalent strands to use the same syntactic representation. For example, while the expression r12+(rax*rbx) may be semantically equivalent to the expression X2+(X4*X7), the syntax of the two expression may be difficult for the similarity analyzer 210 to compare and the similarity analyzer 210 may therefor fail to identify the semantic (behavioral) identity between the two expression.

The similarity analyzer 210 may use one or more optimizers, for example, the CLang optimizer to generate the canonicalized strands by optimizing the strands out of context. Each strand represented as an LLVM-IR procedure may accept as input all the registers partaking in the processing (computation) expressed by the strand. Since the strands are extracted from their context in the basic block, in order to facilitate the use of the CLang optimizer, the similarity analyzer 210 may first manipulate the LLVM-IR to transform the LLVM-IR, for example, change the machine register's representation to global variables and add an instruction returning the strand's value.

The similarity analyzer 210 using the optimizer may perform the canonicalization of the strands through two main steps, eliminating subexpressions and combining redundant instructions, for example, by setting the Clang optimizer with the flags -early-cse and -instcombine respectively. The similarity analyzer 210 using the optimizer may perform the canonicalization of the strands under specific pre-defined rules. The pre-defined rules may define, for example, re-associating binary operations, grouping subsequent additions, converting multiplications with power-of-two constants to shifts and/or the like.

Referring once again to FIG. 3, a capture 306A presents a canonicalized IR of the snippet presented in the capture 304A and a capture 306B presents a canonicalized IR of the snippet presented in the capture 304B. The functional and operational details of the optimization process are known in the art and are out of scope of the present invention.

The similarity analyzer 210 using the optimizer operates over the strands extracted from the LLVM-IR in order to produce canonicalized strands since optimizing the entire basic-blocks may have little effect because multiple computation paths might be intertwined. By optimizing the strands, the similarity analyzer 210 may produce similar expressions for code segments generated using different build environment parameters. For example, the similarity analyzer 210 may produce similar expressions for code that was never optimized (e.g. compiled with –O0) and originally targeted a certain processor architecture and for code that was heavily optimized for a completely different processor architecture.

The similarity analyzer 210 may therefore further process the decomposed strands to represent each strand through a canonicalized and normalized representation transforming each of the strands in order to standardize the strands through commonly known, uniform representations.

As shown at 110, the similarity analyzer 210 may further process the canonicalized strands in order to normalize them. As each canonicalized strand may be represented by a Directed Acyclic Graph (DAG) which stores the expression, the similarity analyzer 210 may compare the canonicalized strands by comparing their DAGs. However, by normalizing the canonicalized strands the similarity analyzer 210 may normalize may simplify their LLVM-IRs. This may improve the comparison accuracy as well as provide a textual representation that may expedite and/or simplify the syntactic analysis and comparison. The similarity analyzer 210 may normalize the canonicalized strands by using the optimizer to generate a linearized version of the canonicalized strands. The similarity analyzer 210 may achieve this by instructing the optimizer to rename all symbols in the canonicalized strand, i.e. its registers and temporary values into sequentially named symbols. This may be essential for cross-architecture comparison, as the names of the specific registers used in a given strand may be irrelevant to the actual semantics expressed by the strand and may be entirely different between processor architectures.

Referring once again to FIG. 3, a capture 308 presents a normalized canonicalized IR of the strands presented in the captures 304A and 306B. As evident from the capture 308, the two strands presented in the captures 306A and 306B, which both originate from a common source code, accurately match each other after the similarity analyzer 210 applies the normalization.

Reference is made once again to FIG. 1.

As shown at 112, the similarity analyzer 210 calculates a probability score for each canonicalized and optionally normalized strand extracted from the LLVM-IR generated for the first binary record 220A to have an equivalent counterpart strand in the LLVM-IR generated for the second binary record 220B. The similarity analyzer 210 may perform the same in the other direction, i.e. calculate the probability score for each canonicalized and normalized strand extracted from the LLVM-IR generated for the second binary record 220B to appear in the LLVM-IR generated for the first binary record 220A.

Since the strands extracted from the LLVM-IRs for the two binary records 220A and 220B are canonicalized and normalized, the similarity analyzer 210 may easily perform a syntactic comparison to identify syntactic similarity and/or equivalence between the strands decomposed from the two LLVM-IRs. This may allow for a significantly faster execution and/or reduced memory footprint for the similarity analyzer 210 as the use of complex and heavy semantic matching may be avoided.

For example, the similarity analyzer 210 may use a set of MD5 hashes to index the strands constituting the basic blocks and efficiently compare the strands in their canonicalized and normalized representation. Thus, given a basic block, for example, a procedure p of the query procedure q, the LLVM-IR representation of p may be denoted as R(p). The LLVM-IR representation of R(p) may comprise the set of MD5 hash values over the canonicalized and normalized strands $s_p$ of the procedure p. The representation may therefore be expressed by equation 1 below.

$$R(p)=\{MD5(\text{Canonicalized\&Normalised}(s_p))|s_p \in p\} \quad \text{Equation 1:}$$

The similarity analyzer 210 may achieve a basic notion of the similarity between a given query procedure q and target procedure t based on the intersection of their (hashed) representation which may be denoted as $M(q, t)=R(q) \cap R(t)$.

As shown at 114, the similarity analyzer 210 adjusts the probability score calculated for each of the strands with a significance value to define the significance of each strand in the overall similarity evaluation for the complete procedure p. Adjusting the probability scores according to the significance of each of the strands in the procedure p may be essential since during the binary record generation, the tool chain, for example, compiler, linker and/or the like may introduce non-semantic related artifacts in the generated assembly, beyond the original content of the source code. These artifacts may be, for example, a side effect of accessing the machine's memory through a certain construct (i.e. a stack), be related to a specific optimization pattern implemented by the tool chain and/or the like. However, since the binary records 220A and/or 220B may be stripped binary records comprising no debug information, identifying the exact origins of the binary records 220A and/or 220B in order to cancel the strands resulting from the artifacts may be complex, imprecise and even impossible. Naturally, the strands originating from the source code may have a significantly higher contribution to the overall (global) similarity of the procedure than the trivial and/or common strands.

The similarity analyzer 210 may therefor apply a weighing algorithm for adjusting the probability scores by estimating which of the strands originates from the source code and carries a semantic (functional) meaning and which of the strands may be originate from the artifacts introduced during generation of the binary records 220A and/or 220B. The weighing algorithm is based on a statistical analysis in which the probability score calculated for each strand is adjusted according to an appearance rate of the strand in a large set of procedures of a large set of binary records. The statistical analysis algorithm is based on the assumption that a common strand, which appears in many procedures, may carry less importance than a rare strand. The probability that a strand s appears "at random" in the large set of procedures may be defined as Pr(s). The similarity analyzer 210 may refine the algorithm for calculating the strand appearance probability by limiting the statistical analysis to strands of IRs extracted from real binary records, in particular binary records generated for the same processor architecture targeted by the evaluated procedure p. The set of strands taken from IRs of the real binary records may be denoted as a global context W and the strands of IRs targeting the same processor architecture may be denoted as an adjusted global context $\tilde{W}$. The similarity analyzer 210 may further refine the algorithm for calculating the strand appearance probability by limiting the statistical analysis to canonicalized and normalized strands. The probability calculation is then adjusted according to the significance of each strand (appearance rate in the set of procedures $\tilde{W}$) as expressed in equation 2 below.

$$Pr_{\tilde{W}}(s) = \frac{|\{p \in \tilde{W} | s \in R(p)\}|}{|\tilde{W}|} \quad \text{Equation 2}$$

As expressed in equation 2, the similarity analyzer 210 determines the $Pr_{\tilde{W}}(s)$ for each strand by dividing the number of different procedures in which the strand appears by the total number of unique strands appearing in all of the procedures of the global context $\tilde{W}$.

Executing the statistical analysis to calculate the significance (appearance rate) of each strand in the set $\tilde{W}$ which may be extremely large may require significant resources, for example, computing resources, time and/or the like and may typically be impossible. The similarity analyzer 210 may therefore limit the statistical analysis to a selected global context composition subset P which represents the global context $\tilde{W}$. The global context subset P may be selected randomly from the adjusted global context $\tilde{W}$. As demonstrated herein after, typically, a relatively small subset, for example, 1,000 procedures may be used to accurately approximate the significance of each of the strands s in the procedure p. The approximated probability may be expressed in equation 3 below.

$$Pr_{\tilde{W}}(s) \simeq P \frac{f(s)}{|P|} \quad \text{Equation 3}$$

Where f(s) is the inverse appearance frequency of the strand s in the subset P:

$$f(s) = \begin{cases} |\{p \in \tilde{W} | s \in R(p)\}| & s \in P \\ 1 & \text{else} \end{cases}$$

Naturally, the similarity analyzer 210 may calculate offline the significance values by determining the appearance frequency of each of the strands s∈P, in particular the appearance frequency in the constant |P|. This may significantly reduce the computing resources and/or computing time required for computing probability score of the strands s of the procedure p.

As shown at 116, the similarity analyzer 210 may calculate an overall similarity score for the procedure q by aggregating the adjusted probability scores calculated for the strands s of the procedure q. The overall similarity score may therefore be expressed in equation 4 below.

$$S_P(q, t) = \sum_{s_P \in R(q) \cup R(t)} \frac{|P|}{f(s)} \quad \text{Equation 4}$$

The similarity analyzer 210 may therefore calculate the similarity score between q and t as the sum of the inverse frequency f(s) of all the strands shared between q and t, normalized by the number of unique strands in the global context subset P.

As stated before, in some embodiments of the present invention, the similarity estimation is based on semantic analysis for estimating the similarity by comparing semantic representations of the binary records.

Reference is now made to FIG. 5, which is a flowchart of an exemplary process of estimating a similarity of binary records based on a semantic analysis, according to some embodiments of the present invention. An exemplary process 500 may be executed to estimate a similarity level of two binary records, for example, the binary records 220A and 220A in a system such as the system 200.

Similarly to the process 100, evaluating the similarity of the two binary records 220A and 220B may be presented as follows. Given the query procedure q of a first binary record, for example the binary record 220A and the large collection T of (target) procedures of a second binary record, for example the binary record 220B, in binary form, the goal of the process 100 is to quantitatively define the similarity of each procedure t∈T to the query q.

As shown at 502, the process 500 starts with a similarity analyzer such as the similarity analyzer 210 obtaining two binary records, for example the binary records 220A and 220B. The step 502 is performed similarly to the step 102 of the process 100.

As shown at 504, the similarity analyzer 210 converts the binary records 220A and 220B to a respective IRs which are platform (processor architecture) agnostic meaning the IRs are independent of the processor architecture for which the binary records 220A and/or 220B are generated, compiled and/or built. Similarly to the step 104 of the process 100, the conversion of the binary files 220A and 220B to their respective IRs may be done in two stages—extracting assembly source code from each of the binary records 220A and 220B and converting (lifting) the assembly code segments extracted from the two binary records 220A and 220B to their respective IRs. The similarity analyzer 210 may apply the same process as described in the step 104 of the process 100 to extract the assembly code from the binary records 220A and 220B.

The similarity analyzer 210 may use one or more tools as known in the art to create IRs, for example, IVL IRs from the assembly code segments originating from the two binary records 220A and 220B. Converting (lifting) the assembly code segments to the IVL IRs may abstract away from specific assembly instructions, while maintaining the semantics of the assembly code. A fresh temporary variable is created for every intermediate value computed throughout the execution. In particular, the similarity analyzer 210 may convert the assembly code segments to Boogie IVL IRs that may suit further embodiments and/or implementations of the process 500 as described herein after.

Reference is now made to FIG. 6, which is a capture of exemplary assembly code snippets and their respective Intermediate Virtual Language (IVL) intermediate representations, according to some embodiments of the present invention. Exemplary captures 602A and 602B are snippets of assembly code segments generated for a similar source code taken from a version of the OpenSSL code package. The capture 602A presents an assembly code snippet compiled from a source code using gcc v4.9 while the capture 602B presents an assembly code snippet compiled from the same source code using icc v15.0.1. As evident while the two snippets presented in the captures 602A and 602B are derived from the same (high level) source code, the assembly code segments may be different due to, for example, the different tool chain used to compile and build them, the different target processor architecture and/or the like. Exemplary captures 604A and 604B present the same assembly code snippets of the captures 602A and 602B respectively after converted (lifted) to the IVL IRs. The statements assume and assert are not part of the IRs and are described hereinafter.

Reference is made once again to FIG. 5.

As shown at 506, the similarity analyzer 210 decomposes the generated IVL IRs to strands as described in the step 106 of the process 100.

Optionally, the similarity analyzer 210 applies one or more size thresholds that may be used for comparing strands of the same magnitude. The size thresholds may define, for example, a number of inputs threshold, a number of variables threshold and/or the like. Furthermore, the similarity analyzer 210 may discard strands having a size not exceeding the size threshold(s) from the semantic analysis. The similarity analyzer 210 may discard such strands since typically such strands provide little and practically negligible contribution to identifying similarity between the compared IRs based on the semantic comparison.

As shown at 508, the similarity analyzer 210 calculates a probability score for each strand of the query procedure q to match a strand in the target procedure t, i.e. the probability for the query procedure q to have an equivalent counterpart strand in the target procedure t. The similarity analyzer 210 may calculate the probability score for each strand based on estimating a semantic (behavioral) similarity and/or equivalence of each pair of strands, one strand of the query procedure q and another strand of the target procedure t.

The similarity analyzer 210 may create a joint execution flow (program) that combines a pair of strands, a first strand taken from the procedure q and a second strand from the procedure t. However, the name space for the variables of each of the strand is separated. The similarity analyzer 210 may then explore the space of equality assumptions on the different inputs to the strands, and check the effect of the assumptions on the equality assertions on the outputs from the strands. FIG. 6 presents an exemplary selection of assumptions—the assume statement preceding the snippets 604A and 604B, and assertions—the assert statement succeeding the snippets 604A and 604B.

As such, the similarity analyzer 210 performs the similarity analysis in three steps, (i) adding equality assumptions over inputs of the two compared strands, (ii) adding assertions that check the equality of all output variables (including temporary variables) and (iii) checking the assertions using one or more tools as known in the art, for example, a program verifier to count how many variables are equivalent. The similarity analyzer 210 may select which variables to pair when assuming and asserting equality by searching the space of possible pairs. The choice of the strand as a small unit of comparison (with a relatively small number of variables), along with program verifier based optimizations may significantly reduce the search space, making the use of a program verifier feasible.

In order to calculate the probability score for a query strand $s_q$ of the query procedure q, the similarity analyzer 210 may first compute an asymmetric similarity measure denoted $VCP(s_q, s_t)$ indicating the level of similarity between the query strand $s_q$ and a target strand $s_t$ of the target procedure t presenting the percentage of variables from $s_q$ having an equivalent counterpart in $s_t$. For example, looking in FIG. 6, the strand presented at 604A may be designated $s_q$ and the strand presented at 604B may be designated $s_t$. The calculated $VCP(s_q, s_t)=1$ for the two strands since (604A and 604B), since all 8 variables from the strand at 604A have an equivalent variable in the strand at 604B. However, in the other direction, $$VCP(s_q, s_t) = \frac{8}{9}$$

since one of the variables of the strand at 604B does not have a counterpart variable in the strand at 604A.

For computing the asymmetric similarity measure VCP as described herein above, the similarity analyzer 210 may utilize one or more tools, for example, the program verifier such as, for example, the Boogie program verifier. To support the Boogie program verifier, the similarity analyzer 210, during step 504, may convert the assembly code segments extracted from the binary records 220A and 220B to a non-branching subset of the (C-like) Boogie IVL as known in the art.

In order to demonstrate the process applied by the similarity analyzer 210 and/or the program verifier, some definitions are first outlined.

Definition 1—

A program state $\sigma$ is a pair (l; values) mapping a set of program variables to their concrete values value s: Var→Val at a certain program location l∈Loc. The set of all possible states of a program P is denoted by $\Sigma_P$. A program trace $\pi \in \Sigma_P^*$ is a sequence of states $\langle \sigma_0, \ldots, \sigma_n \rangle$ describing a single execution of the program. The set of all possible traces for a program is denoted by [[P]]. A first: $\Sigma_P^* \to \Sigma_P$ and last: $\Sigma_P^* \to \Sigma_P$ are defined which return the first and last state in a trace respectively. A strand s∈P is therefore a set of traces, s ⊆ [[P]] comprising the set of all traces generated by all possible runs of s when assuming (considering) all possible assignments to the inputs to s. This abstraction may be used to further define strand equivalence and VCP.

Definition 2—

A variable correspondence between two states, $\sigma_1$ and $\sigma_2$ may be denoted as $\gamma: \text{Var}_1 \nrightarrow \text{Var}_2$, is a (partial) function from the variables in $\sigma_1$ to the variables in $\sigma_2$. It should be noted that several variables may be mapped to a single variable in $\text{Var}_2$. The notation $\Gamma(P_1, P_2)$ denotes the set of all variable correspondences for the pair of programs $(P_1, P_2)$. This matching marks the variables as candidates for input-output equivalence to be proven by the program verifier.

Definition 3—

State and trace equivalence definition. Given two states and a correspondence $\gamma$, if $\forall (v_1, v_2) \in \gamma: \sigma_1(v_1) = \sigma_2(v_2)$, then it may be said that these states are equivalent with respect to $\gamma$, and as such may be denoted $\sigma_1 \equiv_\gamma \sigma_2$. Given two traces and a correspondence $\gamma$ between their last states, if last $(\pi_1) \equiv_\gamma$ last$(\pi_2)$, then it may be said that these traces are equivalent with respect to $\gamma$, and as such may be denoted $\pi_1 \equiv_\gamma \pi_2$.

Definition 4—

Strand equivalence definition. Given two strands $s_1$ and $s_2$ each having inputs denoted inputs($s_1$) and inputs($s_2$) respectively and a correspondence $\gamma$. It may be said that the strands $s_1$ and $s_2$ are equivalent with respect to $\gamma$, and as such may be denoted $s_1 \equiv_\gamma s_2$, if: (i) every input from $s_1$ is matched with some input from $s_2$ under $\gamma$, and (ii) every pair of traces $(\pi_1, \pi_2) \in (s_1, s_2)$ that agree on inputs $(\forall (i_1, i_2) \in (\gamma \cap (\text{inputs}(s_1) \text{ inputs}(s_2)))\text{:first}(\pi_1)(i_1) = \text{first}(\pi_2)(i_2))$ is equivalent $\pi_1 \equiv_\gamma \pi_2$. This expresses input-output equivalence.

Definition 5—

State, trace variable containment proportion definition. The VCP between a query state $\sigma_q$ and a target state $\sigma_t$ may be denoted as the proportion of matched values in $\sigma_q$, denoted $$VCP(\sigma_q, \sigma_t) \triangleq \frac{|\gamma_{max}|}{|\sigma_t|},$$

where $\gamma_{max}$ is the maximal variable correspondence (in size) for which the two states $\sigma_q$ and $\sigma_t$ are equivalent, i.e., $\sigma_1 \equiv_{\gamma_{max}} \sigma_2$, considering all possible gammas. The VCP between two traces which may be denoted $VCP(\pi_1, \pi_2)$ may be defined as $VCP(\text{last}(\pi_q), \text{last}(\pi_t))$. For instance, given value $s_q = \{x \mapsto 3, y \mapsto 4\}$ and value $s_t = \{a \mapsto 4\}$, the maximal correspondence is therefore $\gamma_{max} = \{y \mapsto a\}$ as it matches the most possible variables. Therefore $$VCP(\sigma_q, \sigma_t) = \frac{1}{2}.$$

It should be noted that it is possible for several maximal correspondences to exist, and in such cases one of the candidates may be selected.

Definition 6—

Strand VCP definition. The VCP between two strands $s_q$ and $s_t$ as the proportion of matched variables in the $\gamma$ that induces the maximal containment proportion over all pairs of traces, as expressed in equation 5 below.

$$VCP(s_q, s_t) \triangleq \frac{\max\{|\gamma| \mid \forall (\pi_q, \pi_t) \in (s_q, s_t) : \pi_q \equiv_\gamma \pi_t\}}{|\text{Var}(s_q)|} \quad \text{Equation 5}$$

It may seem that the VCP may produce a high matching score for potentially unrelated pieces of code, for example, in case two strands perform the same calculation but one ends by assigning 0 to all outputs, in case the result of the computation is used for different purposes and/or the like. However, such scenarios may typically not occur since (i) the compiler optimizations may eliminate cases where a computation is not used and (ii) if used for different purposes, the code may still suggest similarity, if for example a portion of the query procedure a is embedded in the target.

The similarity analyzer 210 computes the $VCP(s_q, s_t)$ by encoding input-output equivalence, along with procedure semantics such as a program verifier query. The query consists of three parts, including (i) assuming input equivalence over the inputs in the variable correspondence $\gamma$, (ii) expressing query and target strand semantics by sequentially composing their instructions, and (iii) checking for variable equivalence, over all possible traces, by adding equality assertions checked by the program verifier.

The similarity analyzer 210 may utilize the program verifier, for example, the Boogie program verifier as known in the art. The program verifier function may be denoted as Solve: (Proc, Assertion)→(Assertion→{True, False}). Given a basic block, for example, a procedure p∈Proc with inputs $i_1, \ldots, i_n$ and a set of assertion statements $\phi \subseteq$ Assertions, the Solve( ) function is able to determine which of the assertions in $\phi$ are valid for any execution of p, under all possible values for the inputs $i_1, \ldots, i_n$. The assertions in $\phi$ are mapped to a specific location in p and may specify a property, i.e. a formula in First-Order Logic (FOL) over p's variables that evaluates to True or False according to variable value. The Solve( ) function may label a certain assertion as True if the certain assertion holds (is valid) for all variable values under all input values. The program verifier may extend the program syntax with an assume statement, which may allow for specifying a formula at desired program locations. The purpose of this formula is to instruct the program verifier to assume the formula to always be true at the location where the formula is inserted, and attempt to prove the assertions encountered using all the assumptions encountered in the verification pass.

The similarity analyzer 210 may treat procedure calls of the procedure p as un-interpreted functions while computing the similarity because, (i) an interprocedural approach may considerably limit scalability, as the program verifier may need to evaluate the entire call tree of the procedure p where the tree may be unbounded for recursive calls, and (ii) it is observed that the semantics of calling a procedure is sufficiently captured in the code leading up to the call where arguments are prepared, and the trailing code where the return value is used. Calls to two different procedures having the exact same argument preparation process and using return values in the same way would be determined as similar. However, the similarity analysis using the program verifier may not rely on recognized call targets since these are typically omitted in the stripped binary records such as, for example, the binary records 220A and/or 220B.

For computing the $VCP(s_q, s_t)$, the similarity analyzer 210, using, for example, the Boogie program verifier, may apply an algorithm which for brevity is described in its simplified version in algorithm 2 below. Since the process 500 is based on decomposing the basic block, for example, a procedure p, to strands, the need to resolve branches within the procedure p may be alleviated and the encoding of the program verifier may assume single-path programs. Moreover, this may allow separating variables of the procedure p to Vars(p) denoting only non-input variables in the procedure p and Inputs(p) denoting only inputs to the procedure p.

---
Algorithm 2:
---

Input: query $p^q$ target $p^t$ in Boogie IVL
Output: VCP($p^q$, $p^t$)

1    maxVCP ← 0;
2    for γ ∈ Γ($p^q$, $p^t$) do
3      p ← NewProcedure(Inputs($p^q$) ∪ Inputs($p^t$));
4      for ($i^q$, $i^t$) ∈ (γ ∩ (inputs($p^q$) × inputs($p^t$))) do
5        p.body.Append (assume $i^q$ == $i^t$);
6      p.body.Append ($p^q$.body; $p^t$.body);
7      for ($v^q$, $v^t$) ∈ ((Vars($p^q$) × Vars($p^t$)) ∩ γ) do
8        p.body.Append (assert $v^q$ == $v^t$);
9    Solve (p);
10    if ($p^q$ ≡$_γ$ $p^t$) then
11

$$\text{maxVCP} \leftarrow \max\left(\frac{|\gamma|}{|\text{Vars}(p^q)|}, \text{maxVCP}\right)$$

---

Applying Algorithm 2, the similarity analyzer 210 receives a pair of Boogie procedures $p^q$ and $p^t$ representing the strands a and t, after renaming of variables to avoid naming collisions. The algorithm 2 proceeds with enumerating all possible variable correspondences γ∈Γ($p^q$,$p^t$), where all of $p^q$'s inputs are matched in compliance with Definition 4 above. For each correspondence, a new Boogie procedure p may be created joining the respective elements from the procedures $p^q$ and $p^t$. The algorithm 2 then starts building the procedure body by adding assumptions of equivalence for every pair of inputs in γ which may be essential for checking input-output equivalence. As shown in algorithm 2, the bodies of the query and target Boogie procedures are appended sequentially, capturing both strands' semantics. Lastly, a series of assertion statements are added, whose goal is to assert the exit state equivalence by adding an assertion for all variable pairs matched by γ. The resulting procedure p may then be submitted to the Solve( ) function, which may use the program verifier, for example, the Boogie program verifier to check assertion correctness. If all the assertions are proven, the current VCP is calculated and compared against the maximal VCP computed so far, denoted maxVCP. The higher among the current VCP and maxVCP is selected thus presenting the maximal VCP at the end of every loop run. The algorithm 2 may be repeated until the entire strand $p^q$ is processed.

Based on the computed VCP($s_q$, $s_t$), the similarity analyzer 210 produced the maximal probability score Pr($s_q$|$s_t$), for the each strand $s_q$ in the query procedure q over all possible strands $s_t$ in the target procedure t as expressed in equation 6 below.

$$Pr(s_q|t) \triangleq \max_{s_t \in H_t} Pr(s_q|s_t) \qquad \text{Equation 6:}$$

As shown at 510, the similarity analyzer 210 adjusts the probability score calculated for each of the query strands $s_q$ with a significance value to define the significance of each strand $s_q$ in the overall similarity evaluation for the complete procedure q. As discussed before for the process 100, adjusting the probability scores according to the significance of each of the strands in the procedure p may be essential since during the binary record generation, the tool chain, for example, compiler, linker and/or the like may introduce non-semantic related artifacts in the generated assembly, beyond the original content of the source code.

The likelihood Pr($s_q$|$s_t$) that two strands are input-output equivalent is estimated by applying a sigmoid function denoted g( ) over VCP of the two strands. The sigmoid midpoint may be set to be $x_0$=0.5 as VCP($s_q$, $s_t$)∈[0, 1]. This is expressed in equation 7 below.

$$Pr(s_q|s_t) \triangleq g(VCP(s_q,s_t))=1/(1+e^{-k(VCP(s_q,s_t))-0.5)}) \qquad \text{Equation 7:}$$

The use of the logistic function allows the similarity analyzer 210 to produce a probabilistic measure of similarity, where Pr($s_q$|t) is approximately 1 when Pr($s_q$|$s_t$)=1 and nears 0 when VCP($s_q$, $s_t$)=0. Various experiments were conducted (as described herein after) with different values of a sigmoid curve steepness parameter k of the sigmoid curve to find an optimal value. Based on the experiments selecting the steepness parameter k to be k=10.0 may present optimal results. The use of the sigmoid function may be similar to its application in logistic regression algorithms for classification problems as known in the art. A hypothesis $h_θ(x)$ may be set to be the sigmoid function of the original hypothesis $θ^T x$, resulting in the hypothesis being a probability distribution, $h_θ(x) \triangleq Pr(y=1|x; θ)=g(θ^T x)$, which reflects the likelihood of a positive classification y=1 given a sample x. This correlates to Pr($s_q$|$s_t$) representing the likelihood that $s_q$ and $s_t$ are a positive match for performing the same calculation.

In order to find procedure similarity in the pool of the binary records, it is required that the similarity analyzer 210 match the non-trivial strands of code be across these binary records. This may be essential since according to equation 7 above, the small trivial strands may be assigned with a high likelihood score since they may perform trivial functionality that may be matched with a plurality of strands. Thus a query strand need not only be similar to the target strand but also have a low probability to occur at random. For this the Likelihood Ratio (LR) measure is defined as expressed in equation 8 below.

$$LR(s_q|t)=Pr(s_q|t)/Pr(s_q|H_o) \qquad \text{Equation 8:}$$

The LR measure represents the ratio between the probabilities of finding a semantic equivalent of the query strand $s_q$ in target strand $s_t$ vs. the probability of finding a semantic equivalent at random, i.e. from the random process $H_o$. The probability Pr($s_q$|$H_o$) in fact measures the statistical insignificance of the query strand $s_q$ where a higher probability means low significance. The similarity analyzer 210 may estimate the random hypothesis $H_o$ by averaging the value of Pr($s_q$|$s_t$) over all target strands, i.e., $$Pr(s_q | H_o) = \frac{\sum_{s_t \in T} Pr(s_q | s_t)}{|T|}$$

where T is the set of all target strands for all targets in the corpus (pool of binary records).

The similarity analyzer 210 may compute a Local Evidence Score (LES) for each strand $s_q$. A measure Pr($s_q$|$H_o$) is defined to express the probability of the strand $s_q$ to randomly match all possible strands $H_0$ in the plurality of binary records which may be randomly selected from the code base. The similarity analyzer 210 may compute the LES as shown in equation 9 below.

$$LES(s_q | t) = \log \frac{\max_{s_t \in t} Pr(s_q | s_t)}{Pr(s_q | H_0)} \qquad \text{Equation 9}$$

The LES may provide a measure of the significance of the matching of $s_q$ with t by comparing it to the matching of $s_q$ with the random source $H_0$.

As shown at 512, the similarity analyzer 210 may calculate an overall similarity score, for example, a Global Evidence of Similarity (GES) for the procedure q by aggregating the LES calculated for the plurality of strands s of the procedure q. The similarity analyzer 210 may compute the similarity score GES for the procedure q by aggregating, for example, summing the LES values computed for the strands $s_q \in q$ as expressed in equation 10 below.

$$GES(q|t) = \sum_{s_q \in q} LES(s_q|t) = \sum_{s_q \in q} \log \frac{\max_{s_t \in t} Pr(s_q|s_t)}{Pr(s_q|H_0)} \quad \text{Equation 10}$$

Using the local and global similarity evidence, the similarity analyzer 210 may lift the semantic similarity computed between individual strands into a statistical notion of the similarity between larger code segments, such as, for example, the procedures towards a similarity estimation of the binary records 220A and 220B and/or part thereof. By lifting the strand similarity into procedure similarity, the similarity analyzer 210 may estimate the similarity of the two procedures q and t based on the number and/or amount of non-trivial strands from one of the procedures q and t can be used to compose the other procedure, allowing for some (compiler or patch related) transformation.

The performance, benefits and/or advantages of the methods, processes and systems presented in some of the embodiments of the present invention are demonstrated through evaluations and experiments.

An evaluation of the semantic analysis based comparison as executed by the process 500 is first presented. The evaluation was made using a prototype tool called Esh implemented to accept a query procedure such as the query procedure q and a database of target procedures such as the target procedures T residing in executable binary records, for example, executable files. The query procedure q and the target procedures T are therefore received in binary form. The Esh tool comprising the algorithm 1 and the algorithm 2 was applied to find various prominent vulnerabilities across compilers and source code versions, including, for example, Heartbleed, Shellshock and Venom. As demonstrated hereinafter, the Esh tool produces high accuracy results, with few to no false positives which may be a crucial factor in the scenario of vulnerability search in stripped binaries. Moreover, in some experiments the Esh tool is compared to previous binary code search techniques using challenging search scenarios that combine patched and non-patched versions of real-world vulnerable procedures in binary form, compiled with different compiler versions and vendors and/or target processor architectures. These experiments demonstrate the Esh tool achieving significantly better results.

The Esh tool is implemented with a mixture of C# (for Boogie framework interaction) Python and the evaluation and experiments are conducted on a server with four Intel Xeon E5-2670 (2.60 GHz) processors, 377 GB of DRAM and running Ubuntu 14.04.2 LTS.

Before applying the Esh tool, the assembly code segment(s) extracted from the binary records, for example, the binary records 220A and 220B are first converted to their IVL IR representation as described in the process 500, for example, Boogie IVL IRs. A similarity analyzer such as the similarity analyzer 210 may divide each binary record to one or more procedures using one or more tools as known in the art, for example, a custom IDA Pro (Interactive DisAssembler) Python script, which outputs a single file for every procedure. The similarity analyzer 210 may use one or more tools as known in the art, for example, the BAP to convert the binary procedure into LLVM-IR code, which manipulates a machine state represented by global variables. As evident from FIG. 6, the generated LLVM-IR is in Single Static Assignment (SSA) form, which may be essential for an effective calculation of the VCP. The similarity analyzer 210 may then use one or more translation tools as known in the art, for example, SMACK (Bounded Software Verifier) translator to translate the LLVM-IR into IVL-IRs in this case, Boogie IVL IRs. The similarity analyzer 210 may then split the procedures extracted and divided from the binary record(s) to basic block which may each be decomposed to the plurality of strands as described in the process 500.

In order to make sure the experiments simulate real-world test scenario(s), eight real vulnerable code packages are incorporated in the test-bed. The specific Common Vulnerabilities and Exposures (CVEs) are detailed in Table 1 below. The rest of the target database was composed from randomly selected open-source packages from the Coreutils package.

TABLE 1

| | Procedure/Alias | CVE/Status | #BB | #Strands | S-VCP | | | S-LOG | | | Esh | | |
|---|---|---|---|---|---|---|---|---|---|---|---|---|---|
| | | | | | FP | ROC | CROC | FP | ROC | CROC | FP | ROC | CROC |
| 1 | Heartbleed | 2014-0160 | 15 | 92 | 107 | 0.967 | 0.814 | 0 | 1.000 | 1.000 | 0 | 1.000 | 1.000 |
| 2 | Shellshock | 2014-6271 | 136 | 430 | 246 | 0.866 | 0.542 | 3 | 0.999 | 0.995 | 3 | 0.999 | 0.996 |
| 3 | Venom | 2015-3456 | 13 | 67 | 0 | 1.000 | 1.000 | 0 | 1.000 | 1.000 | 0 | 1.000 | 1.000 |
| 4 | Clobberin' Time | 2014-9295 | 41 | 233 | 351 | 0.797 | 0.343 | 65 | 0.987 | 0.924 | 19 | 0.993 | 0.956 |
| 5 | Shellshock #2 | 2014-7169 | 88 | 294 | 175 | 0.889 | 0.541 | 40 | 0.987 | 0.920 | 0 | 1.000 | 1.000 |
| 6 | ws-snmp | 2011-0444 | 6 | 98 | 42 | 0.981 | 0.879 | 5 | 0.999 | 0.990 | 1 | 1.000 | 0.997 |
| 7 | wget | 2014-4877 | 94 | 181 | 332 | 0.885 | 0.600 | 11 | 0.998 | 0.988 | 0 | 1.000 | 1.000 |
| 8 | ffmpeg | 2015-6826 | 11 | 87 | 222 | 0.9212 | 0.6589 | 97 | 0.9808 | 0.8954 | 0 | 1.000 | 1.000 |

All the code packages are compiled using the default settings, resulting in most of them being optimized using the –O2 optimization level while a few, like OpenSSL, default to –O3. All executables are compiled to the x86_64 (64-bit) architecture as default. In accordance, the implementation of the Esh tool also targets the x86_64 (64-bit) architecture. However, the Esh tool implementation may be easily expanded to support x86 (32-bit) as well as other architectures assuming these architecture are supported by the tool chain used to create the Esh tool. After compilation all debug information was removed to strip the executable binary records. After compiling the source-code into the binary records, the target procedures corpus (pool) contained 1500 different procedures.

Some of the previous techniques suffered from a high rate of false positives, especially as the code corpus grows. Using a general example may demonstrate one cause for such incidents. The example shows that the compiler produces a large amount of compiler-specific code, such as the code for its control structures, to the extent that the compiler may be identified using this code. This is an example of a common pitfall for methods in the fields of binary code search. In case the comparison process is not precise enough when comparing procedures compiled by different compilers, a low similarity score may be wrongly assigned for these procedures on the basis of the generating compiler alone. This is due to the compiler centric code taking precedence over the real semantics of the code, instead of being identified as common code and having its importance reduced in the score calculation.

In the context of the present invention the matching problem may be divided into three vectors identifying the built environment in which the procedures (binary records) are generate built and/or compiled, (i) different compiler versions, (ii) different compilers (vendors and/or processor architectures), and (iii) source-code patches (versions). The process 500 using the Esh tool is first evaluated for binary records built using different versions of the same compiler. Therefore, the last vulnerable version of each package mentioned of table 1 was compiled using the gcc compiler versions 4.{6,8,9}. The same process was performed with the CLang compiler versions 3.{4,5}, and again with the icc compiler versions 15.0.1 and 14.0.4.

The second evaluation of the method 500 is done by searching for similarity among procedures compiled across different compilers. An important aspect of this evaluation process was alternating the query used, each time selecting the query from a different compiler. This also ensured that the process 500 is not biased towards a certain compiler. As explained in before, the similarity analyzer 210 applies an asymmetric matching method and therefore examining these different scenarios may provide evidence for the validity of this asymmetric approach. The third evaluation vector explored during the experiments targets source code patching. A patch may be defined as any modification of the source code that changes the semantics of the procedure. The common case for this is when the procedure's code is altered, yet changes to other procedures or data-structures can affect the semantics as well. It is predicted that precision declines as the size of the patch grows and the procedures exhibit greater semantic difference.

A naive approach to evaluating a method which produces a quantitative similarity score is to attempt finding a "noise threshold". This threshold may transform the quantitative method into a binary classifier by marking all pairs of procedures with a score above the threshold as a match, and the rest as a non-match. However, for most cases there is no clear way to compute and/or detect one threshold which creates a clear separation between true and false positives for all experiments. As this is also true for the process 500, the Esh tool may be evaluated by examining the results of the experiments as a ranked list, and use a measure which reflects whether the true positives are ranked at the top of that list.

The Receiver Operating Characteristic (ROC) is a standard tool in evaluation of threshold based classifiers. The classifier is scored by testing all of the possible thresholds consecutively, enabling treating each method as a binary classifier, i.e. producing 1 if the similarity score is above the threshold. For binary classifiers, accuracy is determined using the True Positive (TP)—the samples that are known as positive, True Negative (TN)—the samples that are known as negative), Positive (P)—the samples classified as positive and Negative (N)—the samples classified as negative) according to the following equation: Accuracy=(TP+TN)/(P+N). Plotting the results for all the different thresholds on the same graph yields a curve; the Area Under this Curve (AUC) is regarded as the accuracy of the proposed classifier.

Evaluating classifiers with Concentrated ROC (CROC) is an improvement over ROC that addresses the problem of "early retrieval"—where the corpus size is huge and the number of true positives is low. The idea behind the CROC method is to better measure accuracy in a scenario with a low number of TPs. The CROC method assigns a higher grade to classifiers that provide a low number of candidate matches for a query, i.e., false positives are penalized more aggressively than ROC. This is appropriate in the setting of the embodiments presented herein, as manually verifying a match is a costly operation for a human expert. Moreover, software development is inherently based on re-use, so similar procedures may typically not appear in the same executable binary record such that each executable binary record is expected to contain at most one TP.

Preliminary experiments with the Esh tool exhibited that employing the naïve use of the program verifier(s) may be infeasible, resulting in many hours of computation for each pair of procedures. Therefore various optimizations are applied to the algorithm(s), in particular the algorithm 2 which may reduce the time required for comparing a pair of procedures to roughly 3 minutes on average on an 8-core Ubuntu machine. It is emphasized that the similarity comparison process 500 may be highly scalable as the program verifier queries may be performed independently and in parallel, allowing performance improvements linearly to the number of computation cores. The algorithm 2 may be optimized to avoid enumerating over all variable correspondences in $\Gamma(p^q, p^t)$ by enumerating over inputs only, Input $(p^q) \times \text{Input}(p^t)$. Furthermore, it is not allowed for multiple inputs in $p^q$ to be matched with a single input in $p^t$, i.e. one-to-one and only allowed for correspondences that matched all of $p^q$ inputs. This reduced the number of outer loop iterations to $\max(|I_q|!, |I_q|!)$. This enumeration may be further reduced by maintaining typing in matches.

For each matching of the inputs, the non-input variable matching part of $\gamma$ starts out simply as $\text{Vars}(p^q) \times \text{Vars}(p^t)$, while maintaining types. A data-flow analysis may be further performed to remove variable pairs that have no chance of being matched, as their calculation uses inputs that were not matched with an initial assumption—are not in $\gamma$. Limiting the matching process of the algorithm 2 to according to the typing and data analysis may allow for evaluating all possible correspondences for non-inputs at once. This may be done by parsing the output of the Boogie program verifier that specifies which of the equality assertions hold and which fail. Unmatched variables are removed, leaving only equivalent pairs in $\gamma$. Finally, multiple matchings for variables are removed as $\gamma$ must be a function over q's variables according to definition 6 and the VCP may be calculated.

Another assumption that may be applied relates to discarding small strands which may typically be trivial and/or common strands which may have a low LES and may therefore have a small contribution to the overall similarity of the two procedures q and t. Strands having a small number of variables are less likely to have a significant LES and may therefore be discarded during the strands comparison process. This may be done by setting a minimal variables threshold, for example, 5 in the presented experiments such that strands having fewer variables than the threshold value are discarded from the matching process and program verifier queries are not generated for them. Moreover, additional thresholds may be set to further limit the number of comparison queries issued by the program verifier. For example, a ratio threshold may be set such that program verifier queries are no produced to compare query strands $s_q$ to target strands $s_t$ that are significantly different in magnitude (size), i.e. having a significantly different number of variables. For example, for the presented experiments the ratio threshold was set to 0.5, meaning that program verifier queries are initiated for query strand $s_q$ to compare to target strands $s_t$ that have at least half the number of variables, i.e. a minimal value of VCP=0.5 is required or at most twice the number of variables to avoid matching with "giant" strands, which are likely to be matched with many strands.

In order to further save on the cost of performing a separate program verifier query for each input matching (which usually contains a small number of assertions), multiple program verifier queries may be batched together. To allow procedure knowledge gathered by the program verifier to be reused by subsequent queries, several possible γ correspondences are embedded in the same procedure by using the non-deterministic branch mechanism in Boogie to make the program verifier consider assumptions and check assertions over several paths. A threshold of maximum assertions per query may be defined, for example, 50,000 as done for the experiments presented herein to limit the number of assertions per query to 50,000.

Figure 7:
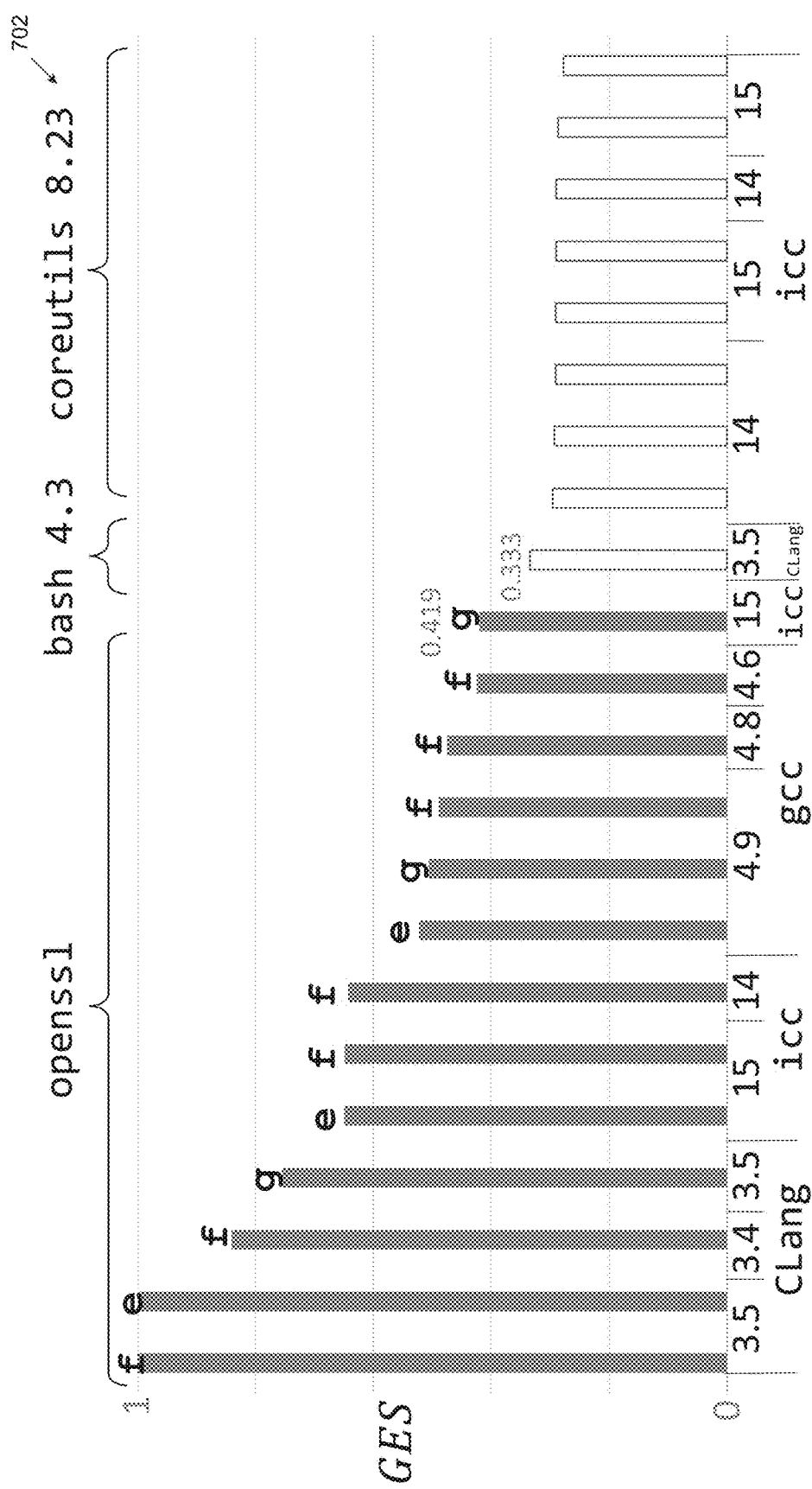
FIG. 7 is a graph presenting results for a similarity estimation experiment for a "Heartbleed" vulnerable procedure, according to some embodiments of the present invention.

Reference is now made to FIG. 7, which is a graph presenting results for a similarity estimation experiment for a "Heartbleed" vulnerable procedure, according to some embodiments of the present invention. The experiment #1 in table 1 uses the "Heartbleed" vulnerable procedure from openssl-1.0.1f compiled with Clang 3.5 as the query. Each bar in a graph 702 represents a single target procedure, and the height of the bar represents the GES similarity score (normalized) against the query. The specific compiler vendor and version were noted below the X axis, the source package and version are noted above the graph 702. Bars filled (grey) represent procedures originating from the same source code as the query (i.e. "Heartbleed") but vary in compilation or source code version. The exact source code version openssl-1.0.1{e,g,f} is specified over the respective bar itself. Procedures unrelated to the query (i.e. "Heartbleed") are not filled (left blank). As can be seen from the results in FIG. 7, the similarity by decomposition estimation presents high scores to all other similar versions of the "Heartbleed" procedure, regardless of the fact that the other versions are compiled using different compilers, different compiler versions or from a patched source code. A gap of 0.08 in the GES score exists between the true positives from the rest of the procedures where the GES is 0.419 for the icc 15 compiled procedure of openssl-1.0.1g "Heartbleed" vs. GES of 0.333 for the bash 4.3 "ShellShock" procedure compiled with Clang 3.5. It is important to note that a fixed threshold may not be established in order to evaluate the quality of these results. As mentioned, this clean separation between the true positives and the false positives may not always be possible. Instead, this result and others, as shown in the following sections, are evaluated according to the produced ranking. The result in FIG. 7 receives a ROC=CROC=1.0 score as it puts all of the true positives in the top of the ranking.

When examining the similarity by decomposition process 500 from bottom up, it may be divided into three layers that may be considered as sub-methods:

S-VCP: The first layer of the process 500 is the way VCP is computed between strands. Without the use of the statistical processing, a similarity score is still defined as: $\Sigma_{s_t \in T} \max_{s_q \in Q}(VCP(s_t, s_q))$. This approach attempts to generalize the VCP from a pair of strands to a pair of procedures by counting the maximal number of matched variables in the entire procedure.

S-LOG: The next layer of the process 500 incorporates the statistical significance of every query strand, by using local and global significance. By alternatively defining $Pr(s_t, s_q)=VCP(s_t, s_q)$ and applying it to LES and GES equations 6 and 7 respectively, it can be seen how the process 500 behaves without applying the sigmoid function to the VCP.

Esh: Adding the use of the sigmoid function results in the method as described herein above for step 510 of the process 500.

Table 1 presents experiments results for each of the sub-methods compared to the complete similarity by decomposition estimation process 500. The results are presented in terms of (i) False Positives (FP), (ii) ROC and (iii) CROC. It should be noted that the number of false positives is counted as determined by a human examiner who receives the list of procedures sorted by similarity scores, and the number of false positives may be defined as the number of non-matching procedures the human examiner may have to test until all the true similar procedures are found. The effectiveness of a method can be measured more precisely and quickly by using CROC. Additional information is included describing the number of basic-blocks and the number of strands extracted from basic blocks, as well as the CVE for every vulnerable procedure searched for.

The results presented in table 1 may clearly demonstrate that each of the sub-methods increases the estimation accuracy and hence reduces the false positives. Comparing between the different experiments may reveal that CROC and ROC scores contribute more than simply counting the number of false positives for every threshold, the CROC and ROC scores may further compare the rate by which the false positive rate grows. Informally, this may be regarded as a prediction of the number of attempts after which the human researcher may give up. An important point is that the size of the query, in terms of the number of basic blocks or strands, does not directly correlate with easier matching.

The results of Experiment #3 as presented in table 1 may reveal an interesting scenario in which even the S-VCP sub-method achieves a perfect score. Upon examination of the query procedure, it is discovered that this occurs because the procedure processed in Experiment #3—the Venom procedure contains several distinct numeric values which are only matched against similar procedures. These are used to explore a data structure used to communicate with the Quick Emulator (QEMU) floppy device.

Examining the results presented in table 1 as a whole, it may be seen that for more than half of the experiments, the use of the S-VCP sub-method which isn't employing the statistical amplification of strands significance, results in a high number of false positives. To understand this better, a thorough analysis of experiment #5 was performed. Examining the values of $Pr(s_q|H_0)$ which express the frequency of appearance (evidence) of the strand $s_q$, it may be seen that several strands may get an unusually high score indicating their higher appearance frequently. It was found that one of the high scoring strands is a sequence of push REG instructions, which are commonplace for a procedure prologue.

Several evaluation experiments were further conducted to evaluate the performance and ability to identify the similarity of query procedures and target procedures (extracted from the binary files) originating at least partially from the same source code but generated, compiled and/or built in a build environment having one or more different aspects (the problem vectors as described herein above). In particular, the differentiating aspects comprise (i) Compiler version—different versions of the compiler (same compiler from same vendor), (ii) Cross-Compiler use (different compiler vendors and/or processor architectures) and (iii) source code patches applied (different versions of the source code). During these experiments, the Esh tool is compared to another prototype tool, TRACY, implemented to target source code patches while evaluating similarity of the binary records. These experiments are mainly focused on the procedures of Experiment #1 in table 1. The results of these experiments are described in table 2 below.

TABLE 2

| | Compiler Version | Cross-Compiler | Patches | TRACY (Ratio-70) | Esh |
|---|---|---|---|---|---|
| 1 | ✓ | | | 1.0000 | 1.0000 |
| 2 | | ✓ | | 0.6764 | 1.0000 |
| 3 | | | ✓ | 1.0000 | 1.0000 |
| 4 | ✓ | ✓ | | 0.5147 | 1.0000 |
| 5 | | ✓ | ✓ | 0.4117 | 1.0000 |
| 6 | ✓ | | ✓ | 0.8230 | 1.0000 |
| 7 | ✓ | ✓ | ✓ | 0.3529 | 1.0000 |

Each line in Table 2 represents a single experiment where the ✓ in one of the columns indicates that respective aspect is applied in the build environment for the two binary records. For example, for the experiment in which the Compiler Version and the Cross-Compiler columns are both checked (line 4 in table 2), all variations of queries are generated using all compiler vendors (and/or targeting different processor architecture) and compiler versions were and placed in the target database.

As evident from the results for the TRACY tool as shown in table 2, the TRACY tool which is designed to handle patches, achieves a perfect grade when dealing with source code patching (line 3 in table 2). Moreover, the TRACY tool may successfully handle the queries compiled using different compiler versions (line 1 in table 2). However, accuracy of the TRACY tool when matching queries and targets complied in Cross-Compiler environment, i.e. using different compilers begins to plummet. Furthermore, when any two build environment differentiating aspects are combined (e.g. lines 4, 5 and/or 6 in table 2), and especially when all three are addressed (line 7 in table 2) the TRACY tool becomes practically unusable. The Esh tool on the other, utilizing the semantic comparison analysis over the decomposed strands as described in the process 500, presents a perfect score for all build environment aspects, including different compiler versions, cross-compilers (different processor architectures) and patching (i.e. different origin source code versions).

To demonstrate the advantages and benefits presented by the Esh tool utilizing the process 500, some experiments were conducted to evaluate the performance of the existing BinDiff tool. The BinDiff tool which is known in the art for comparing whole executables/libraries by matching all the procedures within these libraries. The BinDiff tool works by performing syntactic and structural matching relying mostly on heuristics. The heuristic features over procedures which are the basis for similarity include, for example, number of jumps, location of a given procedure in a call-chain, number of basic blocks, name of the procedure (which may be unavailable in stripped binaries) and/or the like. The BinDiff tool may however ignore the semantics of concrete assembly-level instructions. The results of the evaluation of the BinDiff tool are presented in table 3 below.

TABLE 3

| | Alias/Method | Match Found? | Similarity | Confidence |
|---|---|---|---|---|
| 1 | Heartbleed | x | — | — |
| 2 | Shellshock | x | — | — |
| 3 | Venom | x | — | — |
| 4 | Clobberin' Time | x | — | — |
| 5 | Shellshock #2 | x | — | — |
| 6 | ws-snmp | ✓ | 0.89 | 0.91 |
| 7 | wget | x | 0.3529 | 1.0000 |
| 8 | ffmpeg | ✓ | 0.72 | 0.79 |

Table 3 presents the results for the evaluation experiments conducted using the BinDiff tool for the procedures used to evaluate the Esh tool as shown in table 1. As the BinDiff tool operates on whole (entire) executables/libraries, the query/target is a whole library containing the original vulnerability procedure. Only one target is compared for each query, i.e. the same library compiled with a different vendor's compiler (i.e. different processor architecture), and patched for the queries where patching was evaluated. As evident from table 3, the BinDiff tool failed to find a correct match in all experiments except two—ws-snmp and ffmpeg. This is compared to the Esh tool which was able to provide a quantitative similarity (matching) score for all compared query and target procedures as seen by the results presented in table 1 herein above. The experiments in which the BinDiff tool was able to find a correct match are for the procedures in which the number of blocks and branches remained the same, and may typically be relatively small.

Additional experiments were conducted to evaluate the performance and accuracy of the Esh tool employing the process 500 for a pairwise comparison scenario of all-vs-all in which a plurality of queries are all compared to each other.

Figure 8:
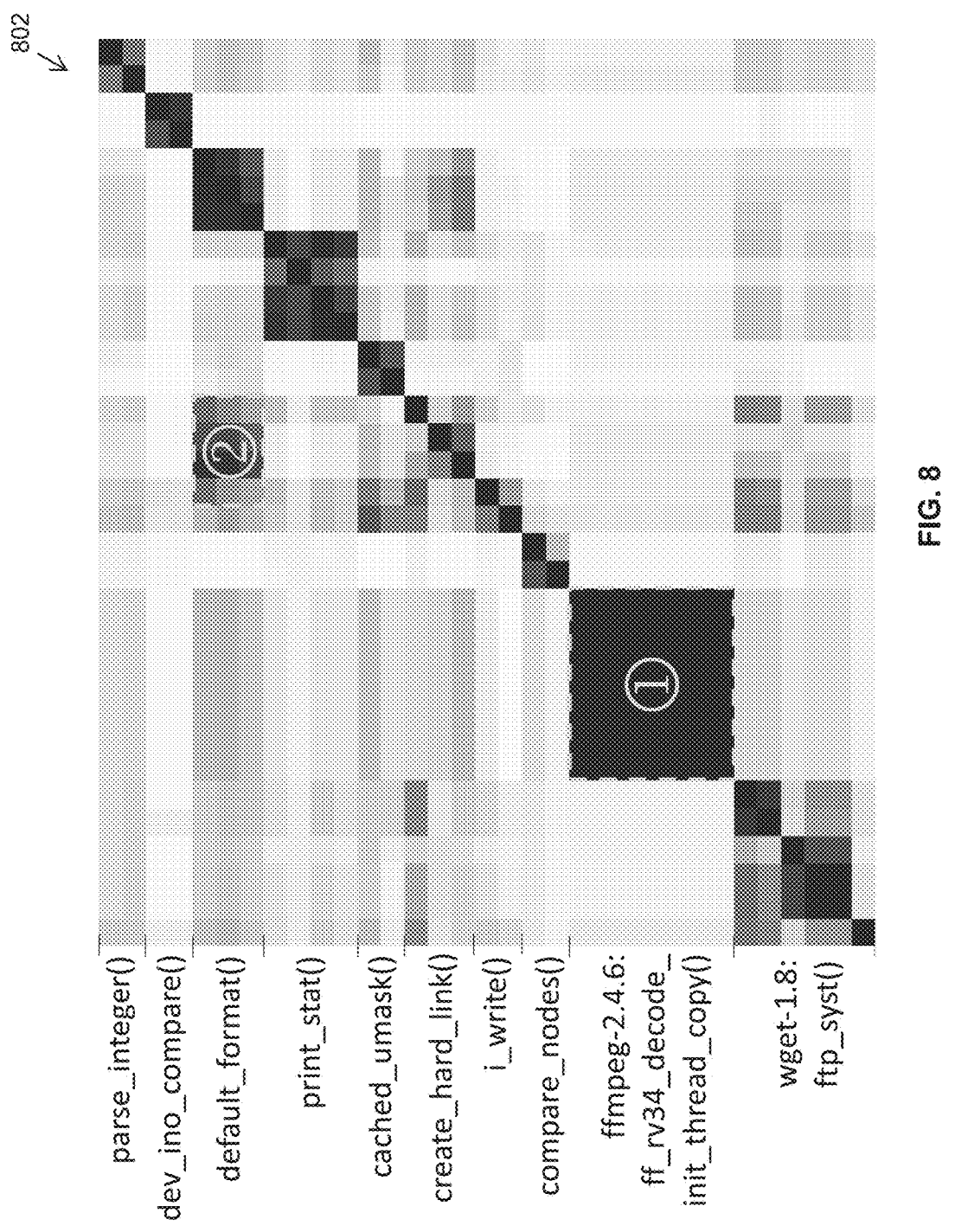

Reference is now made to FIG. 8, which is a heat-map graph presenting results of an All-vs-All experiment for evaluating performance of similarity by decomposition evaluation based on semantic comparison, according to some embodiments of the present invention. A heat-map graph 802 presents similarity measurements produced by the Esh tool in an all-vs-all experiment, where 40 queries were chosen at random from a corpus (the code base) and compared to each other. The results are presented in heat-map form, where the axes represent individual queries, the axes and Y comprise the same queries as listed in axis Y in the same order, and each pixel's intensity represents the similarity score GES calculated by the Esh tool for the respective query-target pair. Naturally, queries that originate from the same procedure and which may have been compiled with different compilers and/or patched (originate from different software versions of the procedure) are coalesced. Different procedures are separated by ticks in the heat-map. At least two different compilations are included for each procedure. The first procedure, leftmost on the X axis, bottom on Y axis is ftp_syst( ) from wget 1.8, which is queried against queries generated in 6 different compilations. The second procedure is taken from ffmpeg 2.4.6, which is queried against queries generated in 7 different compilations. The rest of the procedures are taken from Coreutils 8.23. The average ROC and CROC values for the experiment were 0.986 and 0.959 respectively.

Several observations may be made with respect to the heat-map:

(1) The diagonal of the heat-map graph 802 represents the "ground truth" i.e., each query is matched perfectly with itself.

(2) The GES measure is not symmetrical (as it is based on computing an asymmetrical VCP metric).

(3) The Esh tool provides a clear distinction for ff_rv34_decode_init_thread_copy( ) procedure taken from ffmpeg-2.4.6, marked with a dashed region numbered (1), where all compiled queries of the procedure receive high GES score values when compared with each other and low ones when compared with random procedures. In general, The Esh tool correctly matches (estimates similarity) procedures compiled with different compilers, as evident from the pattern of "boxes" along the diagonal of the heat-map.

(4) The Esh tool produces similar GES score values when comparing groups of queries originating from the same source code (represented by similar shade in the heat-map) to groups of targets originating from other same source code, i.e. the target queries originate for the same source code where the source code of the target queries is different from the source code from which the queries originate.

As seen in the heat-map, the results produced by the Esh tool for some of the queries, for example, default_format( ) seem to be inaccurate as they have high GES score values for matching wrong (non-matching) targets as marked with a dashed region numbered (2). However, the evaluation of the matching should be relative to the matching scores for correct targets, meaning that even if the GES score values are high for wrong targets, the GES score values mat be significantly higher for the correct targets. For the default_format( ) for example, the GES score values of the correct matching target is high as indicated by the dark pixels around the diagonal, therefore relative to that, the set of wrong matching targets indicated by somewhat dark pixels in the middle and the region (2) becomes less significant, which is reflected by a ROC=0.993 and ROC=0.960 AUC scores.

While performing well under most query/target comparison evaluation scenario, the Esh tool may have some limitations while estimating similarity between procedures. One limitation may arise when comparing very small and typically trivial fragments of code, for example, wrappers which typically contain calls to other procedures and hold very little logic of their own. Identifying similarity based on semantic comparison may be therefore very limited. Another limitation may arise when comparing procedures created using generic procedures, for example, as templates such as, for example, using the C concatenation preprocessor directive (##). Procedures created using the template procedures may have similar structure but may vary in type and/or use a function pointer to provide different functionality. Achieving accurate similarity estimation for such procedures may therefore be limited.

An evaluation of the syntactic analysis based comparison as executed by the process 100 was conducted through several experiments to demonstrate the performance, benefits and/or advantages of the methods, processes and systems presented in some of some embodiments of the present invention are demonstrated through evaluations and experiments.

The evaluation was made using a prototype tool called GitZ implemented to execute the process 100 accepting a query procedure such as the query procedure q and a database of target procedures such as the target procedures T residing in executable binary records, for example, executable files. The evaluation was performed over half a million binary procedures, employing 9 compilers targeting leading architectures x86_64 (Intel architecture) and AArch64 (ARM architecture), in 45 compilation setups. Each component of the process 100 implementation is thoroughly examined to evaluate its effectiveness when applied to the different problem vectors concerning the differentiating aspects of the binary records build environment. The evaluation further compares the GitZ tool employing the process 100 to existing methods and techniques as known in the art and demonstrates the improved performance and accuracy of the similarity estimation in the order-of-magnitude speedup.

The evaluation demonstrates the ability of the GitZ tool to perform millions of comparisons efficiently, and find similarity with high accuracy. The GitZ tool may translate binaries from various architectures using the VEX-IR representation using a newly implemented translation engine from VEX-IR to LLVM-IR, which allows for re-optimization using the LLVM optimizer. Implementing the process 100 enables the GitZ tool to harness powerful many-core setups to compute procedure similarity accurately with significant scalability as the comparison may be applied to a plurality of queries simultaneously in parallel. The GitZ tool is evaluated for different use cases using a diverse and challenging dataset of hundreds of thousands of procedures. The GitZ tool was examined for cross-compilers, different optimization schemes, different target processor architecture search scenarios independently and together to evaluate the challenge presented by each of the vectors of the problem.

The corpus of procedures (code base) comprising the plurality of target binary records is constructed in order to evaluate the performance of the GitZ tool with respect to three problem vectors:

(i) Different target processor architectures. The same source code compiled to different processor architectures may be inherently different. The instruction set is different, and even after converting (lifting) the assembly code to the IR, the code may remain different due to different paradigms implemented by the processor architecture. For example, the Intel x86_64 architecture, allows instructions to operate over the higher 8-bit part of certain registers ([abcd]h), while the ARM AArch64 does not allow accessing data at such resolution and requires further computation to extract the same value. To measure the accuracy of the GitZ tool in the cross-architecture setting, the corpus of binary records included binary records from two widely spread architectures: the Intel x86_64 and the ARM AArch64.

(ii) Different compilers, for example, different compiler versions, different vendors and/or the like. Different compilers, for example, different compiler versions, different vendors and/or the like may produce binary records which differ immensely in syntax. The different compilers may differ from each other in one or more build (compile) implementations, for example, use different registers, employ different instruction selection, order instructions differently, structure the code differently and/or the like. To evaluate the ability of the GitZ tool to overcome these differences, the corpus used for the evaluation was compiled using prominent compilers from 3 different vendors, with several versions for each compiler.

(iii) Different optimization schemes and/or levels. Modern compilers may apply various optimization methods. For example, the –O1 and –O2 optimization levels for the gcc compiler each perform as many as 40 different optimization passes. To evaluate the ability of the GitZ tool to identify similarity across optimization schemes, each binary record in the corpus was compiled using each of the optimization flags.

In order to perform a thorough and reliable evaluation, a known ground truth may be established for the compared binary records. To this end the binary records are created according to the three problem vectors.

The experiments conducted for evaluating the GitZ tool are conducted using binary records generated using the following build environment (compilation) setups:

$C_{x64}$—The set of compilers targeting the Intel x86_64 architecture containing CLang 3.{4,5}, gcc 4.{6,8,9} and icc {14,15}.

$C_{ARM}$—The set of compilers targeting the ARM AArch64 architecture containing aarch64-gcc 4.8 and aarch64-Clang 4.0.

O—A set of optimization levels –O{0,1,2,3,s}.

To support this build environment a utility named Compilator was created. The Compilator tool may receive a code package, for example, a procedure as input and compiles it with each of the configurations of the build environment expressed as $\{C_{x64} \cup C_{ARM}\} \times 0$, resulting in 44 binary versions for each procedure. The Compilator tool was used to create ~500K binary procedures from prominent open-source software packages, including OpenSSL, git, Coreutils, VideoLAN, bash, Wireshark, QEMU, wget and _mpeg. Some packages were chosen as they contained vulnerability at one or more specific versions.

The evaluation was conducted using 1,000 procedures randomly selected from the ~500K binary procedures. The strands decomposed from the selected procedures ware used to build a global context P composition which is further detailed herein after.

Applying the process 100, the similarity of a pair of procedures may be quantified as a real number value, within the global context. This means that for every query procedure, the GitZ tool produces a ranking of similar target procedures and thus requires a way (metrics) to evaluate the ranking. Two metrics are used, the first one is the CROC metric which is widely used in assessment of early retrieval methods as known in the art and measures whether there are many false positives at the top of the ranking. The second metric is a percentage of false positives encountered until all true positive are covered which is another reflection of the CROC measure. It is important to note that the CROC measures the rate of false positives encountered as the threshold increases and not only their number and/or percentage. The CROC measure is a means for measuring accuracy over all thresholds, while assigning a higher penalty for false positives. This makes CROC a good choice for the evaluation scenarios, as in many cases a human expert may need to review the results, meaning a low number of false positives is crucial.

One of the main goals of the evaluation experiments is to evaluate the efficiency of the GitZ tool as a scalable vulnerability search tool. Therefore, real-world vulnerabilities are used in the evaluation where the GitZ tool searched for them in the corpus of procedures. The experiment demonstrates how the GitZ tool may be used by a security-savvy organization which aims to find whether it could be vulnerable to a newly found 0-day exploit. Table 4 below presents the results for the evaluation experiments in which 9 real-world vulnerable procedures from open source projects are used as queries and searched against the full 500K procedure corpus, containing 44 positives, i.e. similar procedures originating from the same source code for each query. Each procedure is presented in a different table row specifying the number of false positives, the overall accuracy expresses using the CROC measure, and the overall runtime (rounded).

TABLE 4

| | Procedure/Alias | CVE/Status | (a) GitZ-500: Cross-{Compiler, Architecture, Optimization} | | | (b) GitZ-1500: Cross-Compiler | | | Esh-1500: Cross-Compiler | | |
|---|---|---|---|---|---|---|---|---|---|---|---|
| | | | #FPs | CROC | Run Time | #FPs | CROC | Run time | #FPs | CROC | Run time |
| 1 | Heartbleed | 2014-0160 | 52 | 0.999 | 15 m | 0 | 1 | 1 s | 0 | 1 | 19 h |
| 2 | Shellshock | 2014-6271 | 0 | 1 | 17 m | 0 | 1 | 3 s | 3 | 0.996 | 15 h |
| 3 | Venom | 2015-3456 | 0 | 1 | 16 m | 0 | 1 | 1 s | 0 | 1 | 16 h |
| 4 | Clobberin' Time | 2014-9295 | 0 | 1 | 16 m | 0 | 1 | 2 s | 19 | 0.956 | 16 h |
| 5 | Shellshock #2 | 2014-7169 | 0 | 1 | 12 m | 0 | 1 | 2 s | 0 | 1 | 11 h |
| 6 | ws-snmp | 2011-0444 | 0 | 1 | 14 m | 0 | 1 | 1 s | 1 | 0.997 | 10 h |
| 7 | wget | 2014-4877 | 0 | 1 | 10 m | 0 | 1 | 2 s | 0 | 1 | 15 h |
| 8 | ffmpeg | 2015-6826 | 0 | 1 | 17 m | 0 | 1 | 1 s | 0 | 1 | 20 h |
| 9 | WS-statx | 2014-8710 | 0 | 1 | 18 m | 0 | 1 | 2 s | — | — | — |

As evident from table 4(a), in all the experiments except one, the GitZ tool was able to rank all true positives above all unrelated procedures from a corpus of 500 procedures. For experiment #1 (Heartbleed), the GitZ tool ranked 52 false positives above a true positive (0.0001 FP rate).

The evaluation of the GitZ tool further comprises a comparison to the Esh tool presented herein above. The results of this evaluation are presented in table 4(b). The experiments presented in table 1 herein above were re-created to include searching for the vulnerabilities in a corpus of 1500 procedures. The GitZ tool was able to present results for all problem vectors, i.e. cross-compiler, cross-architecture and cross-optimization. The Esh tool however was able to present results only for the cross-compiler scenarios while unable to perform over cross-architecture and cross-optimization. The results as presented in table 1 for the Esh tool are marked Esh-1500, and the results for the same experiment with the GitZ tool appear alongside, marked GitZ-1500.

As seen in table 4(b) the GitZ tool is able to produce more accurate results with 0 false positives, for the same scenario. Furthermore, since the Esh tool relies on the program verifier, its average runtime is 15.3 hours. The GitZ tool on the other hand, provides a speedup of 4 orders of magnitude, from tens of hours to an average run time of 1.8 seconds. Lastly, a new vulnerability (CVE 2014-8710) is added which was not experimented for the Esh tool and the GitZ tool was able to find all true positives with 0 false positives. There is a slight loss in precision for vulnerability #1 (Heartbleed) for the GitZ-500K experiment compared to the GitZ-1500 experiment, which may be attributed to the more challenging cross-architecture and cross-optimization scenarios combined with the significantly larger corpus.

Additional experiments were conducted to evaluate the performance and accuracy of the GitZ tool employing the process 100 for a pairwise comparison scenario of all-vs-all in which a plurality of queries are all compared to each other. The experiment was conducted using a subset of 1,000 procedures, selected randomly from the 500K corpus of procedures. During the experiment, the GitZ tool was executed in an all-vs-all setting in which the GitZ tool searches each procedure out of the 1,000 selected procedures against all others, which may sum up to approximately 1 million comparisons. The experiment's goal was to evaluate the GitZ tool when either the query or the target binary records consist of any and all of the varying architectures, compilers and/or optimization levels. In this setting, the GitZ tool reports an average CROC accuracy of 0.978 with an average FP rate of 0.03. The overall run time for the experiment was 1.1 hours.

Figure 9:
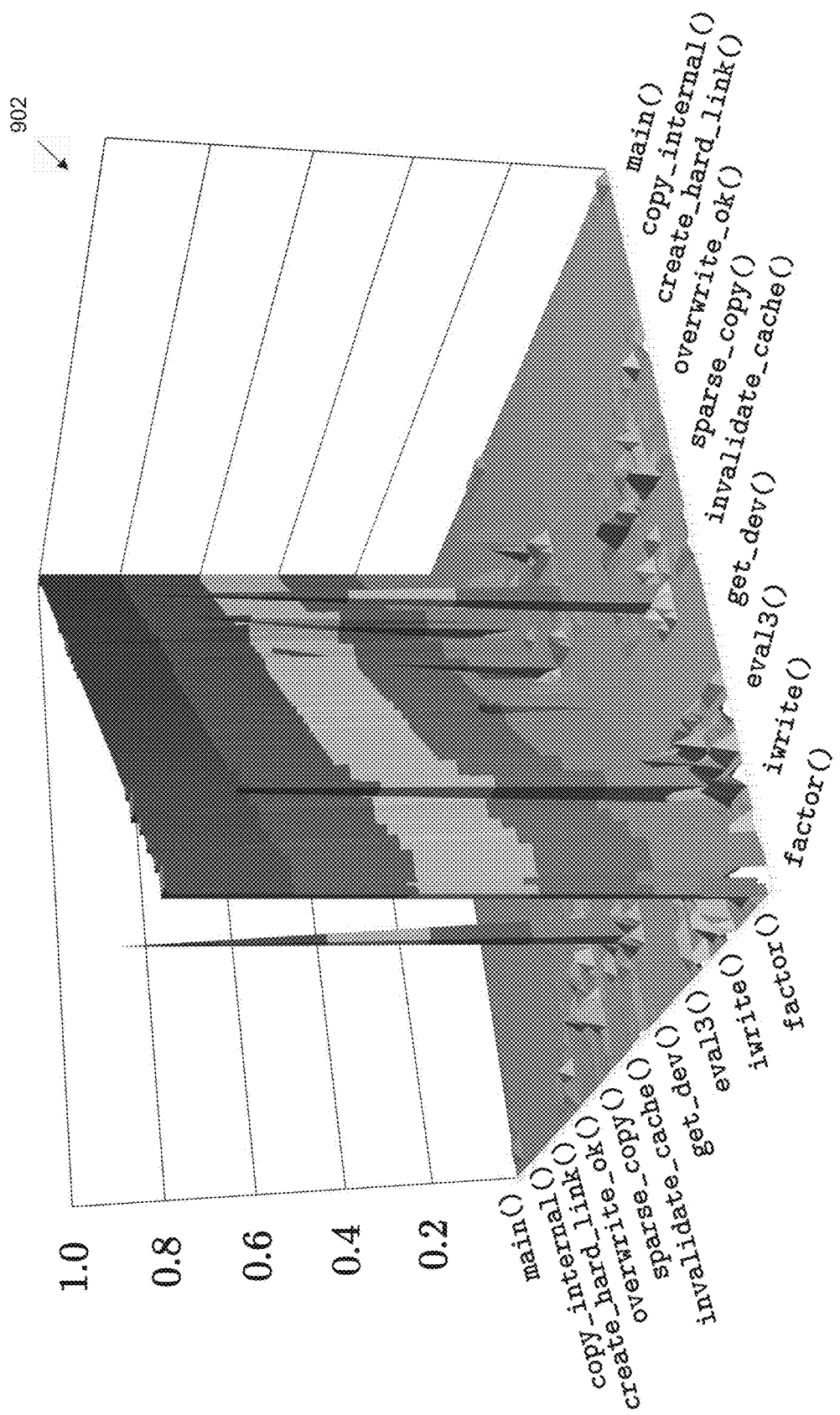
FIG. 9 is a surface height graph presenting results of an All-vs-All experiment for evaluating performance of similarity by decomposition evaluation based on syntactic comparison, according to some embodiments of the present invention.

Reference is now made to FIG. 9, which is a surface height graph presenting results of an All-vs-All experiment for evaluating performance of similarity by decomposition evaluation based on syntactic comparison, according to some embodiments of the present invention. Due to the size of the experiment, presenting the results for the 1,000 procedures may be impractical. Instead, the results for a 100 randomly selected query procedures out of the 1,000 query procedures are presented in the form of a surface height graph 902. The surface height graph 902 presents normalized similarity results in the surface height. Both the X and the Y axes of the surface height graph 902 denote the same dataset which is a list of experimented procedures ordered by name and grouped together according to their source procedure. This means that compilations of the same procedures are coalesced. Some observations may be made with respect to the surface height graph 902:

(1) The diagonal of the surface height graph 902 may present the ground truth meaning that each procedure is matched (determined similar) with itself along with other compilations of the same procedure. The other compilation of the same procedure may be seen as "ridges" along the diagonal "wall". The similarity score for the same procedures compiled differently is, as expected, lower than that of the ground truth and is dependent at least for the most part on how different is the processor architecture, the compiler version and/or the optimization level (flags).
(2) The surface is symmetrical w.r.t the diagonal. This is expected as the similarity metric is symmetrical i.e. S(q, t)=S(t, q) due to the use of an offline global context P.
(3) Some "spikes" may seem out of place. For instance the invalidate_cache( ) procedure from dd.c seems to match with an unrelated procedure and create a false positive. Upon closer examination, the matching procedure is iwrite( ) also from dd.c, where in fact invalidate_cache( ) is a callee. The matching occurs as in that specific compilation if iwrite( ), the callee invalidate_cache( ) was inlined, and the entire procedure body resides inside the binary record, thus explaining the match and asserting it as a true positive.

Table 5 below presents results demonstrating the performance and accuracy of the GitZ tool for the aforementioned all-vs-all experiment in which the GitZ tool evaluates similarity for a plurality of comparison scenarios comprising query/target presenting one or more of the problem vectors as well as combinations thereof, i.e. cross-compiler, cross-architecture and/or cross-optimization.

TABLE 5

| Scenario | # | Queries | Targets | CROC | FPr |
|---|---|---|---|---|---|
| Cross-Compiler Cross-Architecture Cross-Optimization | 1 | * | * | 0.977 | 0.03 |
| Cross-Architecture Cross-Optimization | 2 | $C_{ARM}$ -O* | $C_{x64}$ -O* | 0.963 | 0.01 |
|  | 3 | $C_{x64}$ -O* | $C_{ARM}$ -O* |  |  |
| Cross-Optimization Version | 4 | $gcc_{x64}$ 4.{6, 8, 9} -O* | $gcc_{x64}$ 4.{6, 8, 9} -O* | 0.999 | 0.001 |
|  | 5 | $icc_{x64}$ {14, 15} -O* | $icc_{x64}$ {14, 15} -O* | 0.999 | 0.001 |
|  | 6 | $CLang_{x64}$ 3.{4, 5} -O* | $CLang_{x64}$ 3.{4, 5} -O* | 1 | 0 |
|  | 7 | $gcc_{ARM}$ 4.8 -O* | $gcc_{ARM}$ 4.8 -O* | 1 | 0 |
|  | 8 | $CLang_{ARM}$ 4.0 -O* | $CLang_{ARM}$ 4.0 -O* | 1 | 0 |
| Cross-Compiler x86_64 | 9 | $C_{x64}$ -Os | $C_{x64}$ -Os | 0.992 | 0.001 |
|  | 10 | $C_{x64}$ -O0 | $C_{x64}$ -O0 | 0.992 | 0.001 |
|  | 11 | $C_{x64}$ -O1 | $C_{x64}$ -O1 | 0.986 | 0.002 |
|  | 12 | $C_{x64}$ -O2 | $C_{x64}$ -O2 | 0.992 | 0.001 |
|  | 13 | $C_{x64}$ -O3 | $C_{x64}$ -O3 | 0.992 | 0.001 |
| Cross-Compiler AArch64 | 14 | $C_{ARM}$ -Os | $C_{ARM}$ -Os | 0.988 | 0.002 |
|  | 15 | $C_{ARM}$ -O0 | $C_{ARM}$ -O0 | 0.995 | 0.001 |
|  | 16 | $C_{ARM}$ -O1 | $C_{ARM}$ -O1 | 0.999 | 0.001 |
|  | 17 | $C_{ARM}$ -O2 | $C_{ARM}$ -O2 | 0.995 | 0.001 |
|  | 18 | $C_{ARM}$ -O3 | $C_{ARM}$ -O3 | 0.998 | 0.001 |
| Cross-Architecture | 19 | $C_{x64}$ -Os | $C_{ARM}$ -Os | 0.969 | 0.006 |
|  | 20 | $C_{ARM}$ -Os | $C_{x64}$ -Os |  |  |
|  | 21 | $C_{x64}$ -O0 | $C_{ARM}$ -O0 | 0.977 | 0.004 |
|  | 22 | $C_{ARM}$ -O0 | $C_{x64}$ -O0 |  |  |
|  | 23 | $C_{x64}$ -O1 | $C_{ARM}$ -O1 | 0.960 | 0.006 |
|  | 24 | $C_{ARM}$ -O | $C_{x64}$ -O1 |  |  |
|  | 25 | $C_{x64}$ -O2 | $C_{ARM}$ -O2 | 0.965 | 0.004 |
|  | 26 | $C_{ARM}$ -O2 | $C_{x64}$ -O2 |  |  |
|  | 27 | $C_{x64}$ -O3 | $C_{ARM}$ -O3 | 0.975 | 0.004 |
|  | 28 | $C_{ARM}$ -O3 | $C_{x64}$ -O3 |  |  |

Table 5 presents the results from 28 different settings of the build environment setups used to generate, in particular the compiler setup used to compile the binary records used in the experiment. Where: (i) the "Scenario" column groups similar experiments, i.e. the type of compiler, version, target processor architecture and optimization level, (ii) the "Queries" and "Targets" columns specify the subset of compiler setups used to generate the queries and targets and (iii) the CROC and FPr specify accuracy and false positive rate.

As evident from lines 4-8 of table 5, the GitZ tool presents high performance when evaluating similarity of query and target binary records which are compiled using the same compiler targeting the same processor architecture but with different optimization levels, regardless of compiler vendor and/or the target processor architecture. As seen in lines 9-18 in table 5, the GitZ tool presents a slight loss of precision, when evaluating similarity of query and target binary records which are compiled to target the same processor architecture but using different compilers. It can be seen that the optimization level may have little and generally insignificant impact on the performance of the GitZ tool.

As can be seen from lines 2-3 and 19-28 in Table 5, which describe the cross-architecture scenario, where the compiled queries targeting the AArch64 architecture are searched for in a corpus of x86_64 architecture targets, and vice versa. Each experiment is represented using two lines in the table to emphasize the separation made between the processor architectures, i.e. when searching for an AArch64 query, the target corpus included only x86_64 and vice versa. The cross-architecture scenario presents the greatest challenge for the GitZ tool. This challenge may stem from different implementation paradigms regarding various operations and instructions which may result in strand mismatch, even after canonicalization and normalization.

Reference is now made to FIG. 10, which is a capture of exemplary assembly code snippets of a common source code compiled to target Intel and ARM processor architectures. Captures 1002A and 1002B depict basic blocks (simplified for brevity) taken from the add_ref_tag( ) procedure in pack-objects.c which is a part of version 2.10.0 of the git project. The two blocks perform the same operation—preparing arguments for the procedure call packlist_find (&to_pack, peeled.hash, NULL). The code snippet of the capture 1002A is compiled to target the ARM AArch64 processor architecture while the code snippet of the capture 1002B is compiled to target the Intel x86_64. Both code snippets of the captures 1002A and 1002B are compiled using the gcc compiler employing the same optimization level –O1. Argument preparation is as follows:

(i) The address of the to_pack argument is stored into the X0 register in the AArch64 case (capture 1002A lines 1-2), and the edi register in the x86_64 case (capture 1002B line 3).

(ii) NULL is stored into the X2 register in the AArch64 case (capture 1002A line 4), and the edx register in the x86_64 case (capture 1002B line 1).

(iii) The peeled.hash field, which belongs to the locally allocated peeled struct, is computed at o_set 0x30 of the stack pointer and assigned into X1 in the AArch64 case (capture 1002A line 3), but assigned directly to rsi register in the x86_64 case (capture 1002B line 2), due to a different memory outline. It should be noted that the name of the callee is intentionally left in for clarity. However procedure names may not be used to establish similarity when using the GitZ tool, as they do not exist in the stripped binary setting.

Although most differences of the types (i) and (ii) above may be bridged by the GitZ tool, the different memory layout over architectures may hinder the matching precision of the GitZ tool and may therefore results in some loss in precision. However, the performance and/or accuracy loss of the GitZ tool may be small and still present significant improvement and superiority over the existing methods.

Some of the experiments were conducted to evaluate partial components of the overall similarity estimation process 100, for example, the effect and/or contribution of the canonicalization and/or the normalization.

Figure 11:
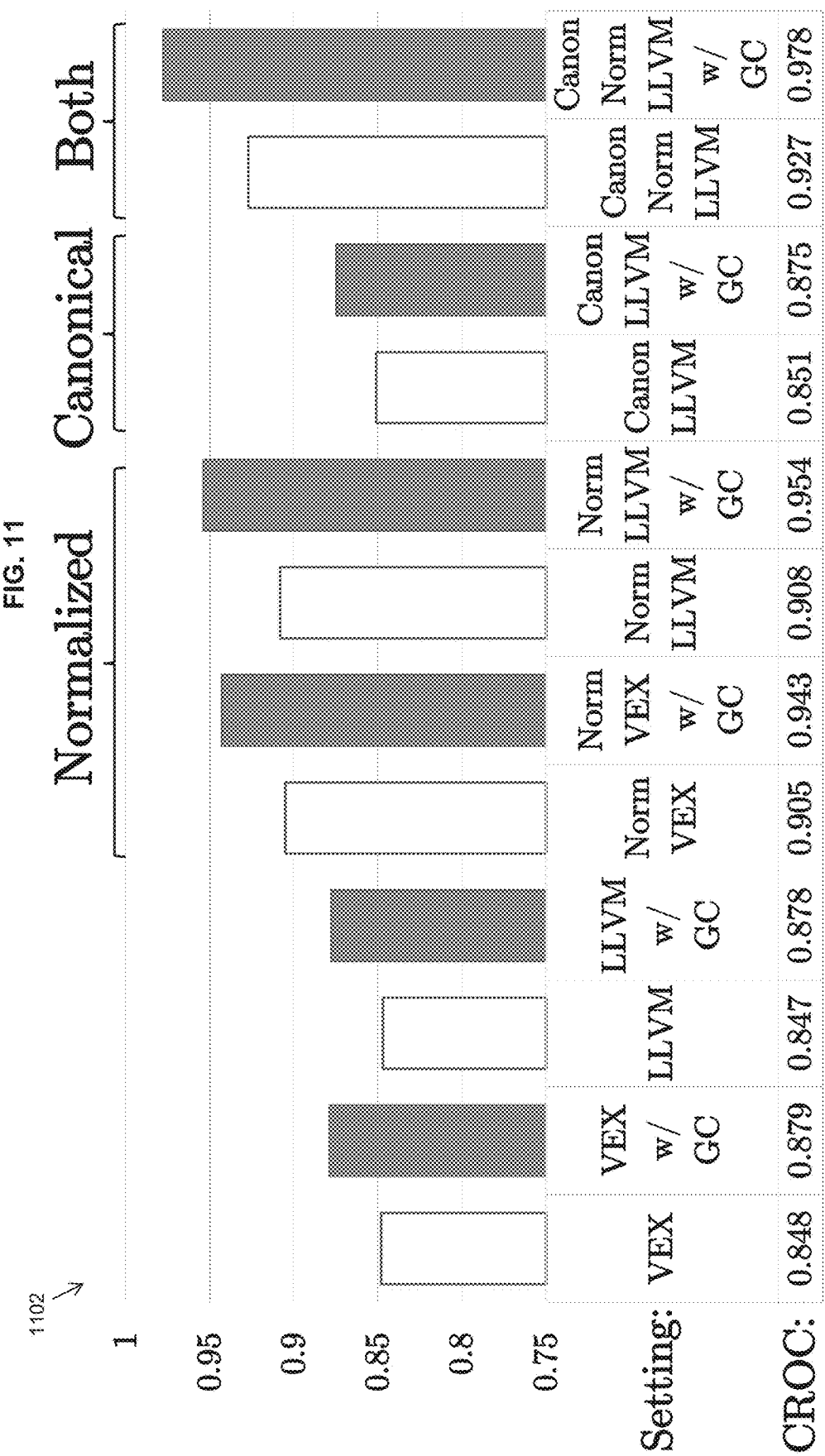
FIG. 11 is a graph presenting results for a similarity estimation experiment presenting the effect of canonicalization and normalization on the similarity by decomposition evaluation based on syntactic comparison, according to some embodiments of the present invention.

Reference is now made to FIG. 11, which is a graph presenting results for a similarity estimation experiment presenting the effect of canonicalization and normalization on the similarity by decomposition evaluation based on syntactic comparison, according to some embodiments of the present invention. A graph 1102 presents the average accuracy for the all-vs-all experiment, in terms of the CROC metric which is denoted in the Y axis and specifically for each scenario below its respective bar) for different scenario settings denoted in the X axis. The graph 1102 presents the accuracy results for the various scenarios in which the partial components of the process 100 are incrementally applied. The leftmost bar represents the accuracy for computing the similarity score by simply counting the number of shared strands over the procedures' VEX-IR strands, without any canonization or normalization, and without a global context. The rightmost bar shows accuracy when applying the GitZ tool implementing the process 100, which is also the result reported in all previous experiments. The FIG. 5 is separated into darker bars and lighter bars, representing results with and without applying the global context P respectively (denoted below each bar). Several observation may be evident from the graph 1102:

(1) Applying the global context P uniformly increases precision of the GitZ tool for all scenario settings.

(2) Normalization may be vital in achieving syntactic equality, which is to be expected due to the high variance in register (and temporary) names, originating from the processor architecture.

(3) The canonicalized, normalized scenario presented by the two rightmost bars, may be significantly affected by the application of the global context P, with a precision gain of 0.051 in the CROC value, which may translate to a substantial false positive rate drop from 0.16 to 0.03. This emphasizes the (beneficial) dependency of the canonicalization and normalization setting (which may typically be the de-facto setting for the GitZ tool) on the global context P, as normalization and canonicalization group together more strands, thus reducing their significance in $\text{Pr}_{\tilde{n}}(s)$.

In order to further understand and evaluate the effect of the global context P on the performance of the GitZ tool additional experiments were conducted in which different variations of the of the global context composition P which is the approximation of the global context are selected for the GitZ tool.

Figure 12:
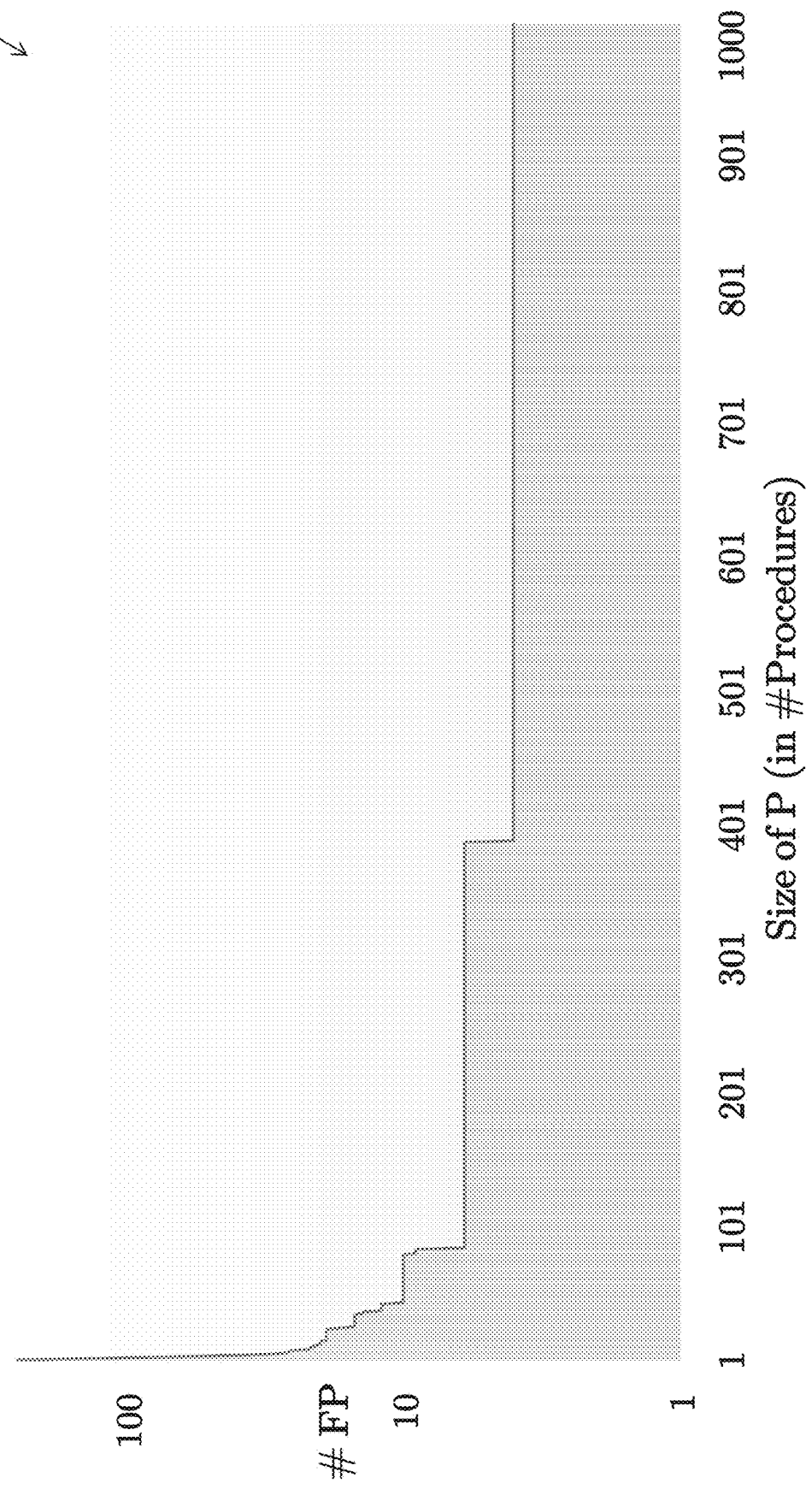
FIG. 12 is a graph presenting results for a similarity estimation experiment presenting the effect of a global context on the similarity by decomposition evaluation based on syntactic comparison, according to some embodiments of the present invention.

Reference is now made to FIG. 12, which is a graph presenting results for a similarity estimation experiment presenting the effect of a global context on the similarity by decomposition evaluation based on syntactic comparison, according to some embodiments of the present invention. A graph 1202 presents an average number of false-positives as a function of the size of the global context composition P, across five randomly selected similarity estimation experiments. In each of the experiments one query is selected from the all-vs-all corpus of binary record procedures and searched by the GitZ tool within the 1,000 procedures corpus. Each of the experiment consisted of multiple runs of the GitZ tool where during each run a different and sequentially growing in size, set of procedures were selected for the global context composition P and used by the GitZ tool to perform the similarity score calculation. As can be seen from the graph 1202, the initial increases in the size of the global context composition P, i.e. adding additional procedures to the global context composition P are reflected in a major decline in the number of false positives hence the accuracy of the GitZ tool increases. However, after reaching a global context composition P of ~400 procedures the accuracy of the GitZ tool reaches a significantly low false positives and the accuracy of the GitZ tool is not significantly improved by adding additional procedures to the global context composition P. Although not expressed in the graph 1202 (in order to maintain clarity and proportion), any further attempts to increase the size of the global context composition P even up to the size of the 500K procedures corpus did not produce better accuracy for the GitZ tool as expressed in the graph 1202 in terms of reduced number of false-positives in the experiments. This may indicate that a finite and relatively small number of procedures included in the global context composition P may be sufficient for the GitZ tool to reach high performance and precision in detecting the similarity between the query and target procedures.

Based on the experiments results as expresses in the graph 1202, the global context composition P was set to 1,000 procedures which is 2.5 times the largest effective size as expressed in the graph 1202, and was composed by randomly selecting the subset of 1,000 procedures form the 500K procedures corpus. This setting of the global context composition P was set for the GitZ tool for further experiments as described herein after.

After selecting the global context composition P an analysis was made to examine the contents of the global context composition P. This analysis revealed two dominating subgroups of strands in the procedures of the global context composition P:

(1) Common strands appearing in all processor architectures. For example, one type of strand which occurs frequently and in all the examined processor architectures is the stack-frame setup and destruction, in the prologue and epilogue of some, mostly large, procedures. This operation may be performed by adding and subtracting from rsp and xsp in the Intel and ARM processor architectures respectively. Another common strand was saving and restoring of the callee-saved registers. The strands of this type were encountered in different variations, for example, with only some callee-saved registers were used, with different stack offsets and/or the like. Despite these variations, the GitZ tool successfully detected these strands as low significance strands within the global context composition P, due to the optimization (canonicalization) and normalization stages as described for the process 100 and implemented by the GitZ tool. The transformation(s) made by the GitZ tool to the strands converted multiple strands of this type into one syntactic form, across compilers and architectures, marking them as common.

(2) Common strands unique to specific processor architectures. One reason for the GitZ tool lower precision in the cross-arch scenario(s) as shown in table 5 may reside in the inherent differences between the processor architectures affecting the representation of the global context composition P. For example, one very common instruction encountered in Intel assembly code is xor some-register, same-register. This instruction simply puts the value of zero in a register, instead of using the instruction mov some-register, 0. Using the xor instruction instead of the mov instruction may typically result from a code-size optimization, as the xor operation on any register is represented using two bytes, while moving the immediate zero to the register requires between three and eight bytes for the instruction itself and the zero immediate. The ARM architecture aligns all instructions to size 4, therefore such instruction size maneuvers are not performed. Moreover, ARM contains a special 'virtual' register called ZR (or R31) which always holds the value of zero and alleviates the need for immediate 0 move altogether. Furthermore, the ARM architecture supports some very useful instructions which are not present in the Intel architecture. For example, the 'Compare Branch Zero' (CBZ) instruction, which jumps to a specified offset if the operand register is equal to zero. Several Intel instructions can be used to represent this operation, for example, cmp reg, 0; jz offset. However, the flags register will be affected by the cmp instructions, essentially creating a different computation. In this scenario the Intel computation will contain a new flag storing the comparison's result, breaking the equivalence, and may in turn cause the computation's representation in the strands to diverge. As result the GitZ tool may fail to detect the similarity (match) of strands originating from the same source code but compiled to target different processor architectures, i.e. the Intel architecture and the ARM architecture.

It is expected that during the life of a patent maturing from this application many relevant software code intermediate representation methodologies, formats and/or tools will be developed and the scope of the terms software code intermediate representation methodologies, formats and/or tools respectively, are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of improving a performance of a computer system in estimating a similarity of binary records comprising executable code, comprising:
by a hardware processor of a computer system:
converting a first binary record and a second binary record to a first intermediate representation and a second intermediate representation respectively;
decomposing each of said first intermediate representation and said second intermediate representation to a plurality of strands, each of said plurality of strands comprises a chain of a plurality of program instructions processing a certain variable and is partially dependent on one or more other of said plurality of strands;
identifying a subset of said plurality of strands of said first intermediate representation as candidates for comparison with respective at least one strand of said second intermediate representation according to at least one predefined characteristic;

calculating a score for each strand of said subset of said plurality of strands of said first intermediate representation to have an equivalent counterpart in said second intermediate representation by comparing said each strand of said subset to said at least one strand of said second intermediate representation;

adjusting said score for said each strand of said subset according to a significance value calculated for said each strand of said subset; and determining when said first binary record and said second binary record are similar by calculating a similarity score defining a functional similarity between said first intermediate representation and said second intermediate representation by aggregating said adjusted score of said subset of said plurality of strands.

2. The computer implemented method of claim 1, wherein at least one of said first binary record and said second binary record are stripped binaries comprising no debugging information.

3. The computer implemented method of claim 1, wherein said first binary record and said second binary record are each generated from a source code for different processor architectures.

4. The computer implemented method of claim 1, wherein said first binary record and said second binary record are each generated from a source code using a different compiler.

5. The computer implemented method of claim 1, wherein said first binary record and said second binary record are each generated using different optimization schemes.

6. The computer implemented method of claim 1, wherein said first binary record and said second binary record are each generated from a different version of a source code.

7. The computer implemented method of claim 1, wherein said first intermediate representation and said second intermediate representation are processor architecture independent, said first intermediate representation and said second intermediate representation are members of a group consisting of: a Low Level Virtual Machine Intermediate Representation (LLVM-IR), an Intermediate Verification Language Intermediate Representation (IVL-IR), a Mcsema Intermediate Representation (Mcsema-IR), a Valgrind's RISC-like Intermediate Language IR (VEX-IR) and a Binary Analysis Platform Intermediate Representation (BAP-IR).

8. The computer implemented method of claim 1, wherein said comparing comprising:

syntactically analyzing each of said plurality of strands of said first intermediate representation and said second intermediate representation after canonicalizing said each strand by optimizing said each strand out of context using a virtual machine language optimizer, and comparing a syntactic equivalence of said each strand of said subset of strands of said first intermediate representation to said at least one strand of said second intermediate representation.

9. The computer implemented method of claim 8, further comprising normalizing said each strand by renaming symbols detected in said each strand in a sequential order to remove name spaces inherited from a context of a respective one of said first intermediate representation and second intermediate representation.

10. The computer implemented method of claim 1, wherein said comparing comprising:

semantically analyzing each of said plurality of strands of said first intermediate representation and said second intermediate representation, and comparing a semantically equivalence of said each strand of said subset of strands of said first intermediate representation to said at least one strand of said second intermediate representation.

11. The computer implemented method of claim 10, wherein said semantic analysis comprises:

creating a joint execution flow containing said each strand of said first intermediate representation to said at least one strand of said second intermediate representation, applying at least one equality assumption over at least one input to said joint execution flow, and comparing at least one assertion applied to at least one variable of said joint execution flow, said at least one variable is a member of a group consisting of: a temporary variable and an output variable.

12. The computer implemented method of claim 10, wherein said identifying said subset is by identifying each strand of said plurality of strands of said first intermediate representation which exceeds a size threshold compared to said at least one strand of said second intermediate representation.

13. The computer implemented method of claim 10, further comprising said comparing is done in at least one batch comprising a plurality of comparison queries of said each strand of said subset of strands of said first intermediate representation to a plurality of strands of said second intermediate representation.

14. The computer implemented method of claim 10, further comprising estimating a behavioral similarity of said plurality of strands of said first intermediate representation and said second intermediate representation based on said semantical analysis.

15. The computer implemented method of claim 1, wherein said significance value of said each strand is estimated by statistically analyzing a plurality of strands extracted from a plurality of binary records to detect a uniqueness of said each strand.

16. The computer implemented method of claim 15, further comprising said statistical analysis is conducted over a randomly selected subset of said plurality of binary records.

17. The computer implemented method of claim 1, wherein said calculating and said adjusting of said plurality of strands of said subset is conducted simultaneously in parallel.

18. The computer implemented method of claim 1, wherein said at least one predefined characteristic is selected from a group consisting of a size of strand and a number of variables in a strand.

19. A computer system with improved performance in estimating a similarity of binary records comprising executable code, comprising:

at least one hardware processor adapted to execute code, said code comprising:

code instructions to convert a first binary record and a second binary record to a first intermediate representation and a second intermediate representation respectively;

code instructions to decompose each of said first intermediate representation and said second intermediate representation to a plurality of strands each of said plurality of strands comprises a chain of a plurality of program instructions processing a certain variable and is partially dependent on one or more other of said plurality of strands;

code instructions to identify a subset of said plurality of strands of said first intermediate representation as candidates for comparison with respective at least one strand of said second intermediate representation according to at least one predefined characteristic;

code instructions to calculate a score for each strand of said subset of said plurality of strands of said first intermediate representation to have an equivalent counterpart in said second intermediate representation by comparing said each strand of said subset to at least one strand of said second intermediate representation;

code instructions to adjust said score for said each strand of said subset according to a significance value calculated for said each strand of said subset; and code instructions to determine when said first binary record and said second binary record are similar by calculating a similarity score defining a functional similarity between said first intermediate representation and said second intermediate representation by aggregating said adjusted score of said subset of said plurality of strands.

20. A computer system with improved performance in estimating a similarity of binary records comprising executable code of which at least one binary record is a malicious code agent, comprising:

at least one hardware processor adapted to execute code, said code comprising:

code instructions to convert a first binary record and a second binary record to a first intermediate representation and a second intermediate representation respectively;

code instructions to decompose each of said first intermediate representation and said second intermediate representation to a plurality of strands, each of said plurality of strands comprises a chain of a plurality of program instructions processing a certain variable and is partially dependent on one or more other of said plurality of strands;

code instructions to identify a subset of said plurality of strands of said first intermediate representation as candidates for comparison with respective at least one strand of said second intermediate representation according to at least one predefined characteristic;

code instructions to calculate a score for each strand of said subset of said plurality of strands of said first intermediate representation to have an equivalent counterpart in said second intermediate representation by comparing said each strand of said subset to said at least one strand of said second intermediate representation;

code instructions to adjust said score for said each strand of said subset according to a significance value calculated for said each strand of said subset; and code instructions to determining when said first binary record and said second binary record are similar by calculating a similarity score defining a functional similarity between said first intermediate representation and said second intermediate representation by aggregating said adjusted score of said subset of said plurality of strands;

wherein at least one of the first binary record and the second binary record is a malicious code agent.

* * * * *